(12) United States Patent (10) Patent No.: US 9,075,241 B2
Liu et al. (45) Date of Patent: Jul. 7, 2015

(54) LIQUID CRYSTAL LENS AND STEREO DISPLAY USING THE SAME

(71) Applicant: AU Optronics Corporation, Hsin-Chu (TW)

(72) Inventors: Sheng-Chi Liu, Hsin-Chu (TW); Yung-Sheng Tsai, Hsin-Chu (TW); Jen-Lang Tung, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 116 days.

(21) Appl. No.: 13/873,370

(22) Filed: Apr. 30, 2013

(65) Prior Publication Data

US 2014/0152923 A1 Jun. 5, 2014

(30) Foreign Application Priority Data

Nov. 30, 2012 (TW) .............................. 101145070 A

(51) Int. Cl.
*G02F 1/13* (2006.01)
*G02B 27/22* (2006.01)
*G02B 3/14* (2006.01)

(52) U.S. Cl.
CPC .............. *G02B 27/2214* (2013.01); *G02B 3/14* (2013.01)

(58) Field of Classification Search
USPC .................................... 349/15, 200, 201, 202
See application file for complete search history.

(56) References Cited

U.S. PATENT DOCUMENTS

| 5,084,778 | A * | 1/1992 | DeJule et al. | 349/143 |
| 8,300,206 | B2 * | 10/2012 | Kim et al. | 349/202 |
| 8,531,646 | B2 * | 9/2013 | Shi et al. | 349/202 |
| 2008/0252720 | A1 * | 10/2008 | Kim et al. | 348/59 |
| 2011/0096250 | A1 * | 4/2011 | Cha et al. | 349/15 |
| 2012/0019733 | A1 * | 1/2012 | Kim et al. | 349/15 |
| 2012/0120333 | A1 * | 5/2012 | Chen et al. | 349/33 |
| 2013/0208196 | A1 * | 8/2013 | Kim et al. | 349/15 |
| 2014/0118644 | A1 * | 5/2014 | Liu et al. | 349/15 |

FOREIGN PATENT DOCUMENTS

| CN | 103336398 | 10/2013 |
| TW | 201011350 | 3/2010 |

* cited by examiner

*Primary Examiner* — Hoan C Nguyen
(74) *Attorney, Agent, or Firm* — WPAT, PC; Justin King

(57) ABSTRACT

A liquid crystal lens includes a first substrate, a second substrate, a liquid crystal layer, a plurality of first main electrodes, and a plurality of second main electrodes. The second substrate is disposed opposite to the first substrate. The liquid crystal layer is disposed between the first substrate and the second substrate. The first main electrodes are disposed on a surface of the first substrate adjacent to the liquid crystal layer. Any two adjacent first main electrodes define a first gap therebetween. The second main electrodes are disposed on a surface of the second substrate adjacent to the liquid crystal layer. Any two adjacent second main electrodes define a second gap therebetween. A vertical projection of each first main electrode on the surface of the second substrate overlaps at least two adjacent second main electrodes to form overlapping portions of the at least two second main electrodes, respectively.

20 Claims, 26 Drawing Sheets

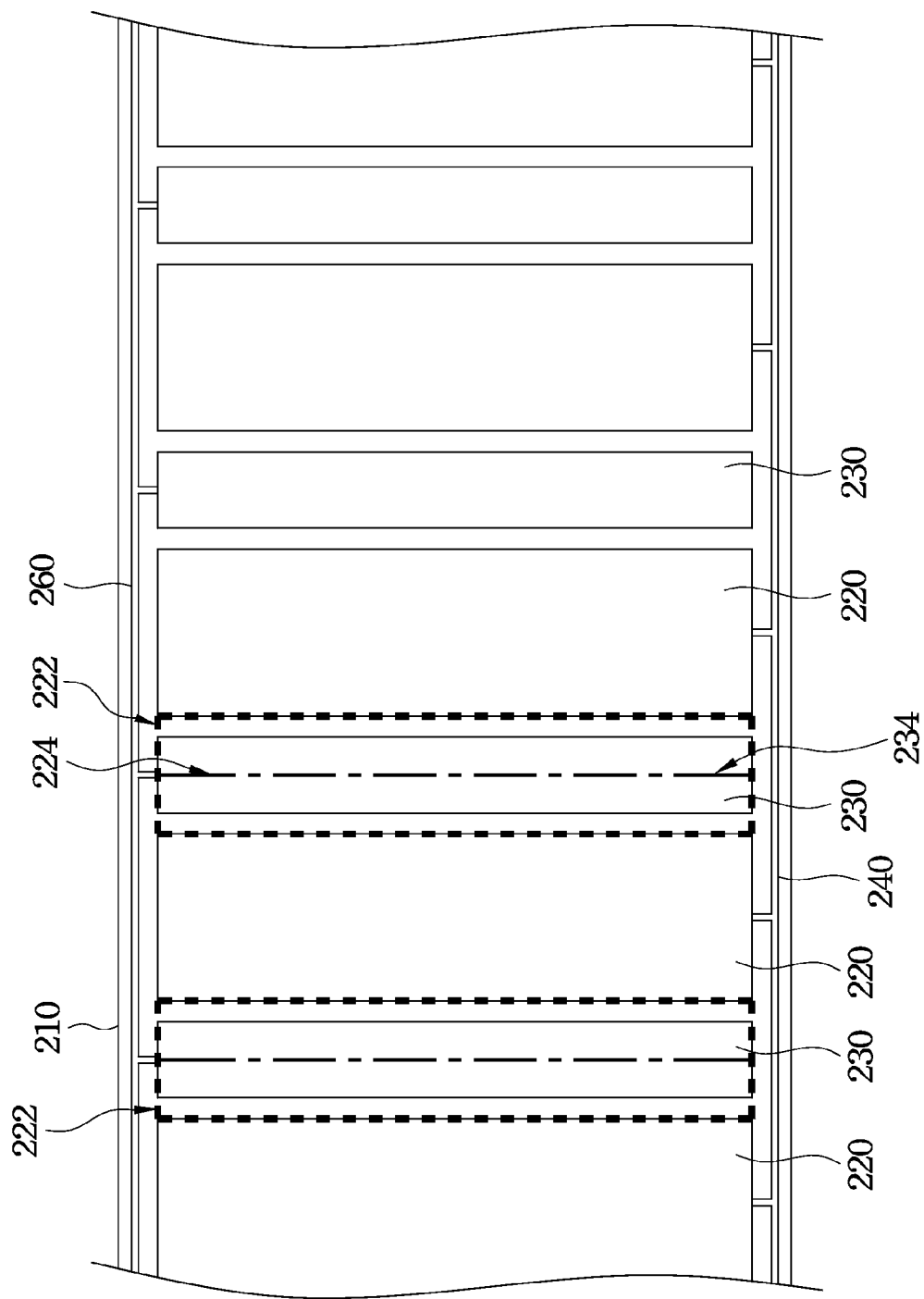

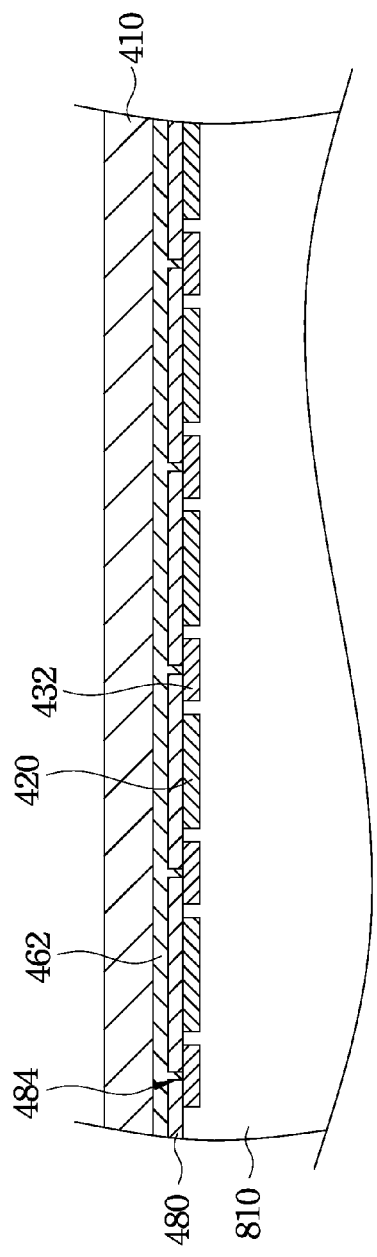
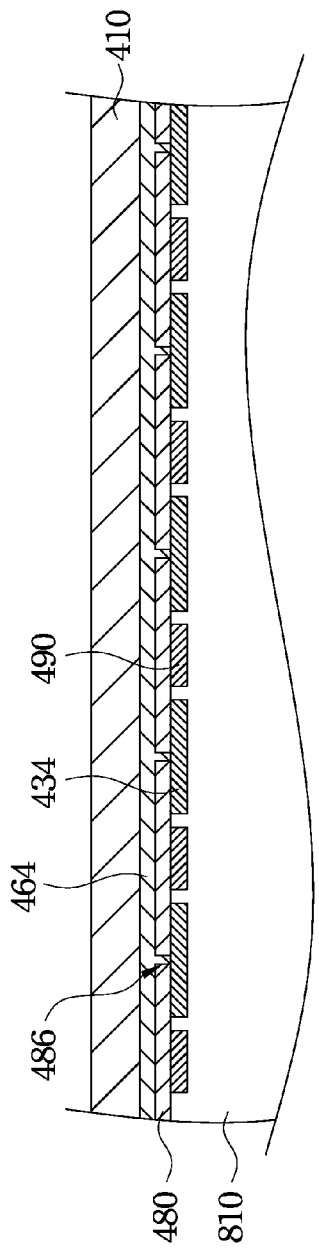
Fig. 17
Fig. 18

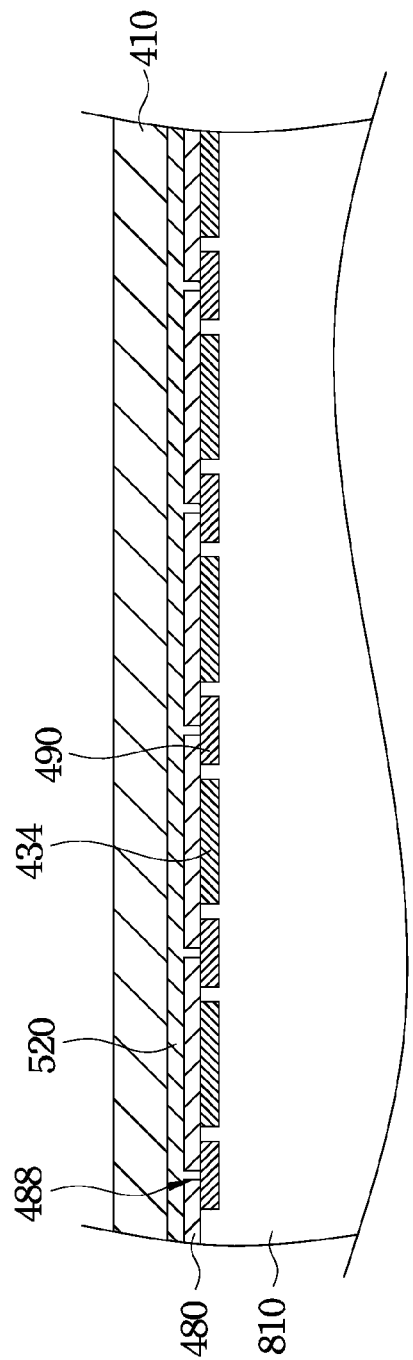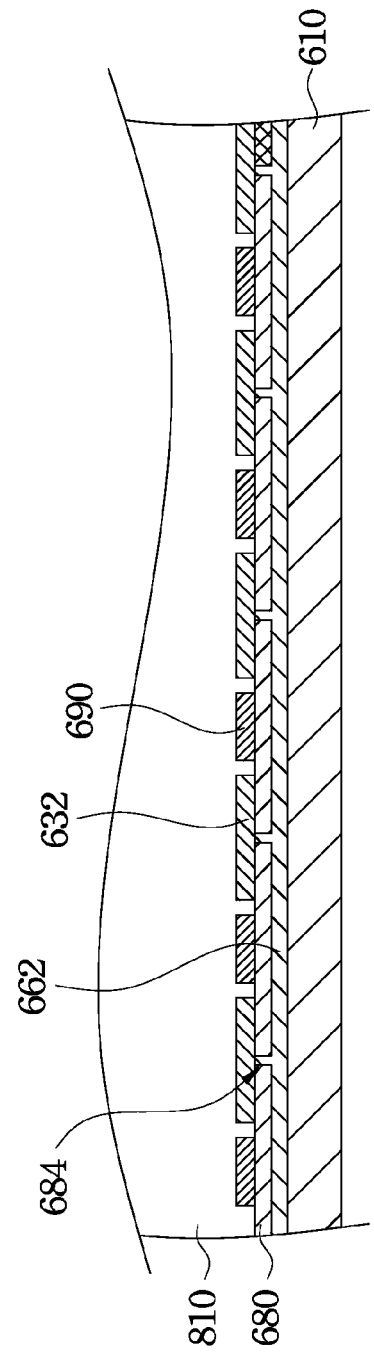

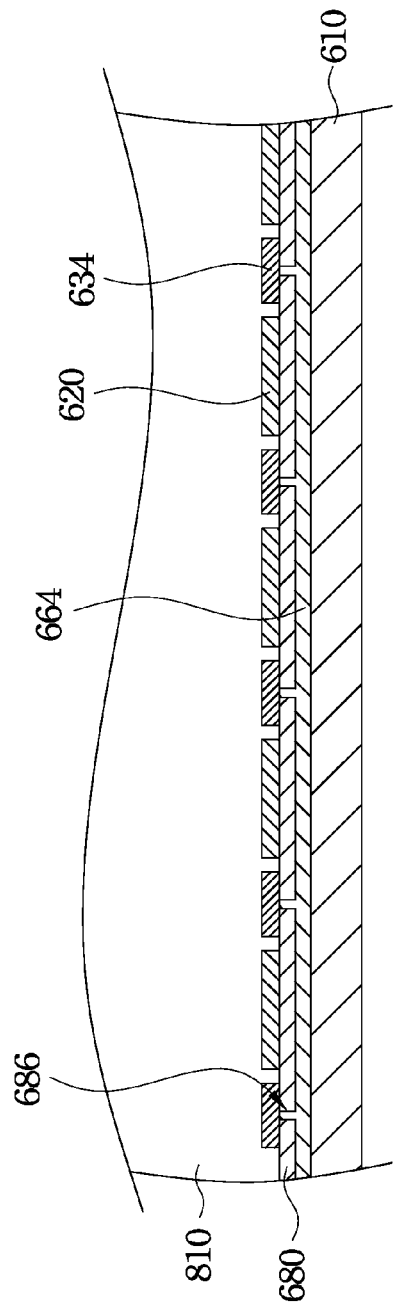
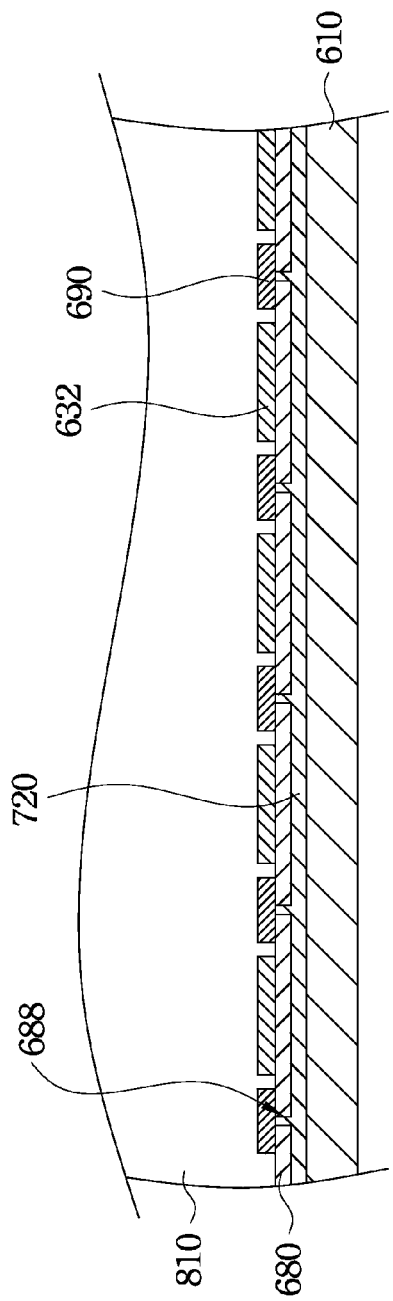

LIQUID CRYSTAL LENS AND STEREO DISPLAY USING THE SAME

RELATED APPLICATIONS

This application claims priority to Taiwan Application Serial Number 101145070, filed Nov. 30, 2012, which is herein incorporated by reference.

BACKGROUND

1. Field of Invention

The invention relates to a liquid crystal lens.

2. Description of Related Art

The liquid crystal lens is a lens having a graded index and made of a liquid crystal material. Since an axial distribution of a liquid crystal can be changed by applying different voltages to reach a zoom effect, the liquid crystal lens has been used in a stereo display recently as a switching device between a two-dimensional image and a three-dimensional image.

In a conventional liquid crystal lens, a refractive index distribution constituted of the liquid crystal is difficult to match with a physical lens, which not only leads to a poor lens effect, but also leads to an undesirable zoom effect. Additionally, under an interaction between a rubbing orientation and an electrode boundary effect, it is easy to cause a disclination line between liquid crystal molecules. Moreover, if it is wanted to change a dimension of the liquid crystal lens, a simulation recalculation should be performed for both of a configuration manner and a size of an electrode, which is inconvenient.

SUMMARY

Therefore, an aspect of the invention provides a liquid crystal lens. An arrangement structure of electrodes of the liquid crystal lens is utilized, so that a refractive index distribution of the liquid crystal lens fits with the refractive index distribution of a physical lens correspondingly.

A liquid crystal lens includes a first substrate, a second substrate, a liquid crystal layer, a plurality of first main electrodes, and a plurality of second main electrodes. The second substrate is disposed opposite to the first substrate. The liquid crystal layer is disposed between the first substrate and the second substrate. The first main electrodes are disposed on a surface of the first substrate adjacent to the liquid crystal layer. Any two adjacent first main electrodes define a first gap therebetween. The second main electrodes are disposed on a surface of the second substrate adjacent to the liquid crystal layer. Any two adjacent second main electrodes define a second gap therebetween. A vertical projection of each first main electrode on the surface of the second substrate overlaps portions of at least two adjacent second main electrodes. The vertical projection of each first main electrode on the surface of the second substrate overlaps each of at least two adjacent second main electrodes to form an overlapping portion having an overlapping width W, where $0\ \mu m \leq W \leq 50\ \mu m$.

In one or more embodiments, the vertical projection of each second main electrode on the surface of the first substrate overlaps at least two adjacent first main electrodes.

In one or more embodiments, the size of the first main electrode can be the same as the size of the second main electrode.

In one or more embodiments, the size of the first gap can be the same as the size of the second gap.

In one or more embodiments, the first main electrodes and the second main electrodes can be strip-shaped, and respectively disposed on the first substrate and the second substrate along a linear direction.

In one or more embodiments, the first main electrodes and the second main electrodes can be island-shaped, and respectively disposed on the first substrate and the second substrate as an array.

In one or more embodiments, the liquid crystal lens optionally further includes a first insulating layer, at least one first main wire, a second insulating layer, and at least one second main wire. The first insulating layer is disposed between the first substrate and the first main electrodes, and the first insulating layer has a plurality of first main through holes formed therein. The first main wire is disposed at one side of the first insulating layer opposite to the first main electrodes, and is electrically connected to the first main electrodes respectively via the first main through holes. The second insulating layer is disposed between the second substrate and the second main electrodes, and the second insulating layer has a plurality of second main through holes formed therein. The second main wire is disposed at one side of the second insulating layer opposite to the second main electrodes, and is electrically connected to the second main electrodes respectively via the second main through holes.

In one or more embodiments, the liquid crystal lens optionally further includes a first main voltage source and a second main voltage source. The first main voltage source is used for making the first main electrodes have a first main voltage through the first main wire. The second main voltage source is used for making the second main electrodes have a second main voltage through the second main wire. A first voltage difference exists between the first main voltage and the second main voltage, and the first voltage difference is about 0 V to ±30 V.

In one or more embodiments, the first main wire and the second main wire can be substantially interlaced.

In one or more embodiments, the liquid crystal lens optionally further includes at least one first main wire, at least one second main wire, the first main voltage source and the second main voltage source. The first main wire is disposed on the first substrate, and is electrically connected to the first main electrodes respectively. The second main wire is disposed on the second substrate, and is electrically connected to the second main electrodes respectively. The first main voltage source is used for making the first main electrodes have the first main voltage through the first main wire. The second main voltage source is used for making the second main electrodes have the second main voltage through the second main wire. The first voltage difference exists between the first main voltage and the second main voltage, and the first voltage difference is about 0 V to ±30 V.

In one or more embodiments, the liquid crystal lens optionally further includes a plurality of first auxiliary electrodes and a plurality of second auxiliary electrodes. Each of the first auxiliary electrodes is disposed in the first gap. The first auxiliary electrodes and the first main electrodes are not contacted to each other, and the size of each of the first main electrodes is greater than the size of each of the first auxiliary electrodes. Each of the second auxiliary electrodes is disposed in the second gap. The second auxiliary electrodes and the second main electrodes are not contacted to each other, and the size of each of the second main electrodes is greater than the size of each of the second auxiliary electrodes.

In one or more embodiments, each first gap has a first gap center, and the first auxiliary electrode disposed therein has a first auxiliary electrode center. Positions of the first auxiliary electrode center and the first gap center can coincide substantially.

In one or more embodiments, each first gap has the first gap center, and the first auxiliary electrode disposed therein has the first auxiliary electrode center. The first auxiliary electrode center can depart from the first gap center.

In one or more embodiments, each second gap has a second gap center, and the second auxiliary electrode disposed therein has a second auxiliary electrode center. The positions of the second auxiliary electrode center and the second gap center can coincide substantially.

In one or more embodiments, each second gap has the second gap center, and the second auxiliary electrode disposed therein has the second auxiliary electrode center. The second auxiliary electrode center can depart from the second gap center.

In one or more embodiments, the liquid crystal lens optionally further includes at least one first main wire, at least one second main wire, at least one first auxiliary wire, at least one second auxiliary wire, the first main voltage source, the second main voltage source, the first auxiliary voltage source, and the second auxiliary voltage source. The first main wire is disposed on the first substrate, and is electrically connected to the first main electrodes respectively. The second main wire is disposed on the second substrate, and is electrically connected to the second main electrodes respectively. The first auxiliary wire is disposed on the first substrate, and is electrically connected to the first auxiliary electrodes respectively. The second auxiliary wire is disposed on the second substrate, and is electrically connected to the second auxiliary electrodes respectively. The first main voltage source is used for making the first main electrodes have the first main voltage through the first main wire. The second main voltage source is used for making the second main electrodes have the second main voltage through the second main wire. The first voltage difference exists between the first main voltage and the second main voltage. The first auxiliary voltage source is used for making the first auxiliary electrodes have a first auxiliary voltage through the first auxiliary wire. A second voltage difference exists between the second main voltage and the first auxiliary voltage. The second auxiliary voltage source is used for making the second auxiliary electrodes have a second auxiliary voltage through the second auxiliary wire. A third voltage difference exists between the first main voltage and the second auxiliary voltage. The first voltage difference is greater than the second voltage difference and the third voltage difference. The first voltage difference is about 0 V to ±30 V, the second voltage difference is about 0 V to ±20 V, and the third voltage difference is about 0 V to ±20 V.

In one or more embodiments, the liquid crystal lens optionally further includes the first insulating layer, at least one first auxiliary wire, the second insulating layer, and at least one second auxiliary wire. The first insulating layer is disposed between the first substrate and the first auxiliary electrodes, and the first insulating layer has a plurality of first auxiliary through holes formed therein. The first auxiliary wire is disposed at one side of the first insulating layer opposite to the first auxiliary electrodes, and is electrically connected to the first auxiliary electrodes respectively via the first auxiliary through holes. The second insulating layer is disposed between the second substrate and the second auxiliary electrodes, and the second insulating layer has a plurality of second auxiliary through holes formed therein. The second auxiliary wire is disposed at one side of the second insulating layer opposite to the second auxiliary electrodes, and is electrically connected to the second auxiliary electrodes respectively via the second auxiliary through holes.

In one or more embodiments, the first insulating layer can be further disposed between the first substrate and the first main electrodes, and the first insulating layer has a plurality of first main through holes formed therein. The second insulating layer can be further disposed between the second substrate and the second main electrodes, and the second insulating layer has a plurality of second main through holes formed therein. Additionally, the liquid crystal lens optionally further includes at least one first main wire, at least one second main wire, the first main voltage source, the second main voltage source, the first auxiliary voltage source and the second auxiliary voltage source. The first main wire is disposed at the side of the first insulating layer opposite to the first main electrodes and the first auxiliary electrodes, and is electrically connected to the first main electrodes respectively via the first main through holes. The second main wire is disposed at the side of the second insulating layer opposite to the second main electrodes and the second auxiliary electrodes, and is electrically connected to the second main electrodes respectively via the second main through holes. The first main voltage source is used for making the first main electrodes have the first main voltage through the first main wire. The second main voltage source is used for making the second main electrodes have the second main voltage through the second main wire. The first voltage difference exists between the first main voltage and the second main voltage. The first auxiliary voltage source is used for making the first auxiliary electrodes have the first auxiliary voltage through the first auxiliary wire. The second voltage difference exists between the second main voltage and the first auxiliary voltage. The second auxiliary voltage source is used for making the second auxiliary electrodes have the second auxiliary voltage through the second auxiliary wire. The third voltage difference exists between the first main voltage and the second auxiliary voltage. The first voltage difference is greater than the second voltage difference and the third voltage difference. The first voltage difference is about 0 V to ±30 V, the second voltage difference is about 0 V to ±20 V, and the third voltage difference is about 0 V to ±20 V.

In one or more embodiments, either of the first main wire and the first auxiliary wire, and either of the second main wire and the second auxiliary wire can be substantially interlaced.

In one or more embodiments, the first auxiliary wire and the second auxiliary wire can be substantially interlaced.

Another aspect of the invention provides a stereo display. The stereo display includes a display panel and the aforementioned liquid crystal lens. The display panel has a display area. The aforementioned liquid crystal lens is disposed at the front of the display area of the display panel.

In one or more embodiments, the display panel can include a pixel array having a row direction and a column direction. An arrangement direction of first main electrodes of the liquid crystal lens is neither parallel to the row direction nor the column direction.

In one or more embodiments, the display panel can include the pixel array having the row direction and the column direction. The arrangement direction of second main electrodes of the liquid crystal lens is neither parallel to the row direction nor the column direction.

BRIEF DESCRIPTION OF THE DRAWINGS

FIG. 3 is a top view of a second substrate in FIG. 1;

FIG. 17 is a cross-sectional view from the first substrate to the liquid crystal layer shown by making the extension direction of any first auxiliary wire 462 in FIG. 11 as the cross-sectional line;

FIG. 18 is a cross-sectional view from the first substrate to the liquid crystal layer shown by making the extension direction of any first auxiliary wire 464 in FIG. 11 as the cross-sectional line;

FIG. 19 is a cross-sectional view from the first substrate to the liquid crystal layer shown by making the extension direction of any third auxiliary wire in FIG. 11 as the cross-sectional line;

FIG. 20 is a cross-sectional view from the liquid crystal layer to the second substrate shown by making the extension direction of any second auxiliary wire 662 in FIG. 11 as the cross-sectional line;

FIG. 21 is a cross-sectional view from the liquid crystal layer to the second substrate shown by making the extension direction of any second auxiliary wire 664 in FIG. 11 as the cross-sectional line;

FIG. 22 is a cross-sectional view from the liquid crystal layer to the second substrate shown by making the extension direction of any fourth auxiliary wire in FIG. 11 as the cross-sectional line;

DETAILED DESCRIPTION

A In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
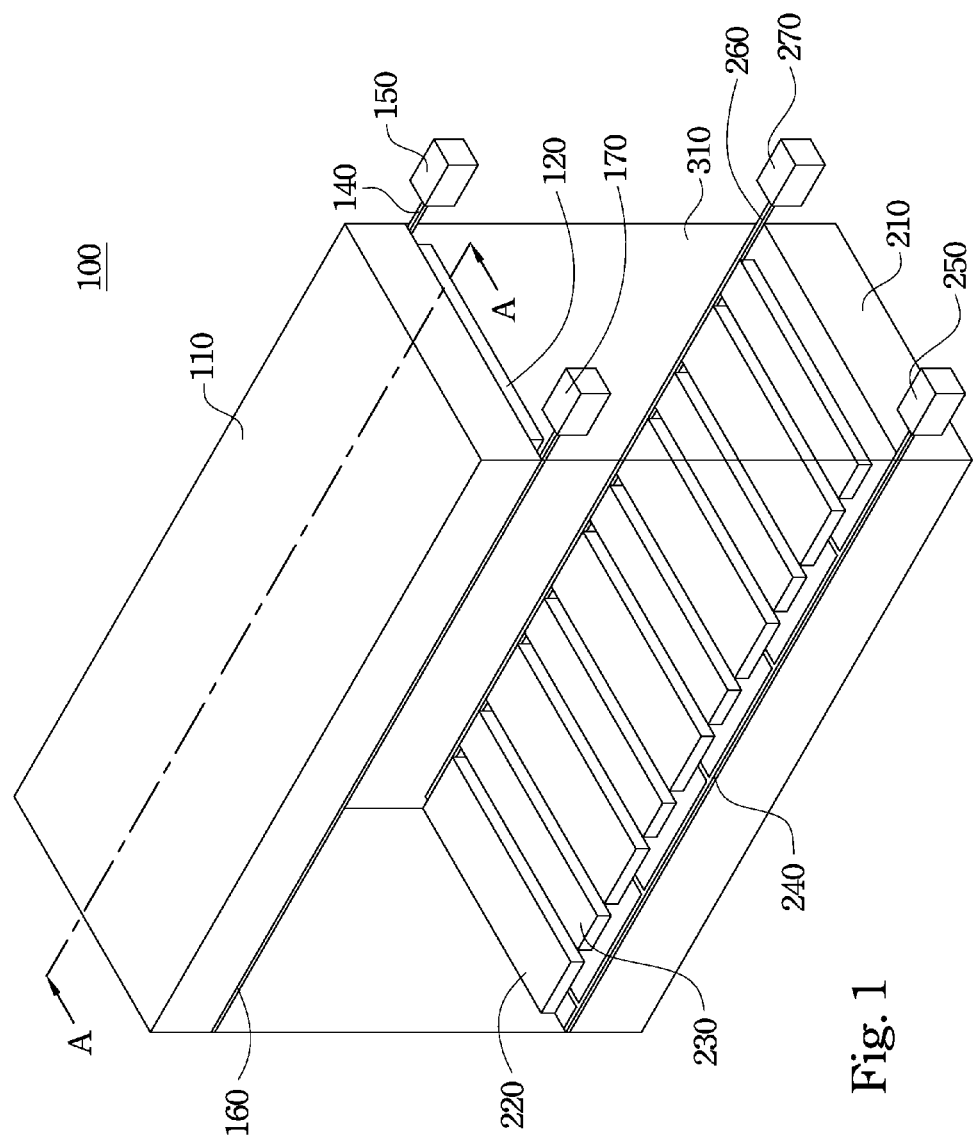
FIG. 1 is a schematic view of a liquid crystal lens according to one embodiment of the invention.
Figure 2:
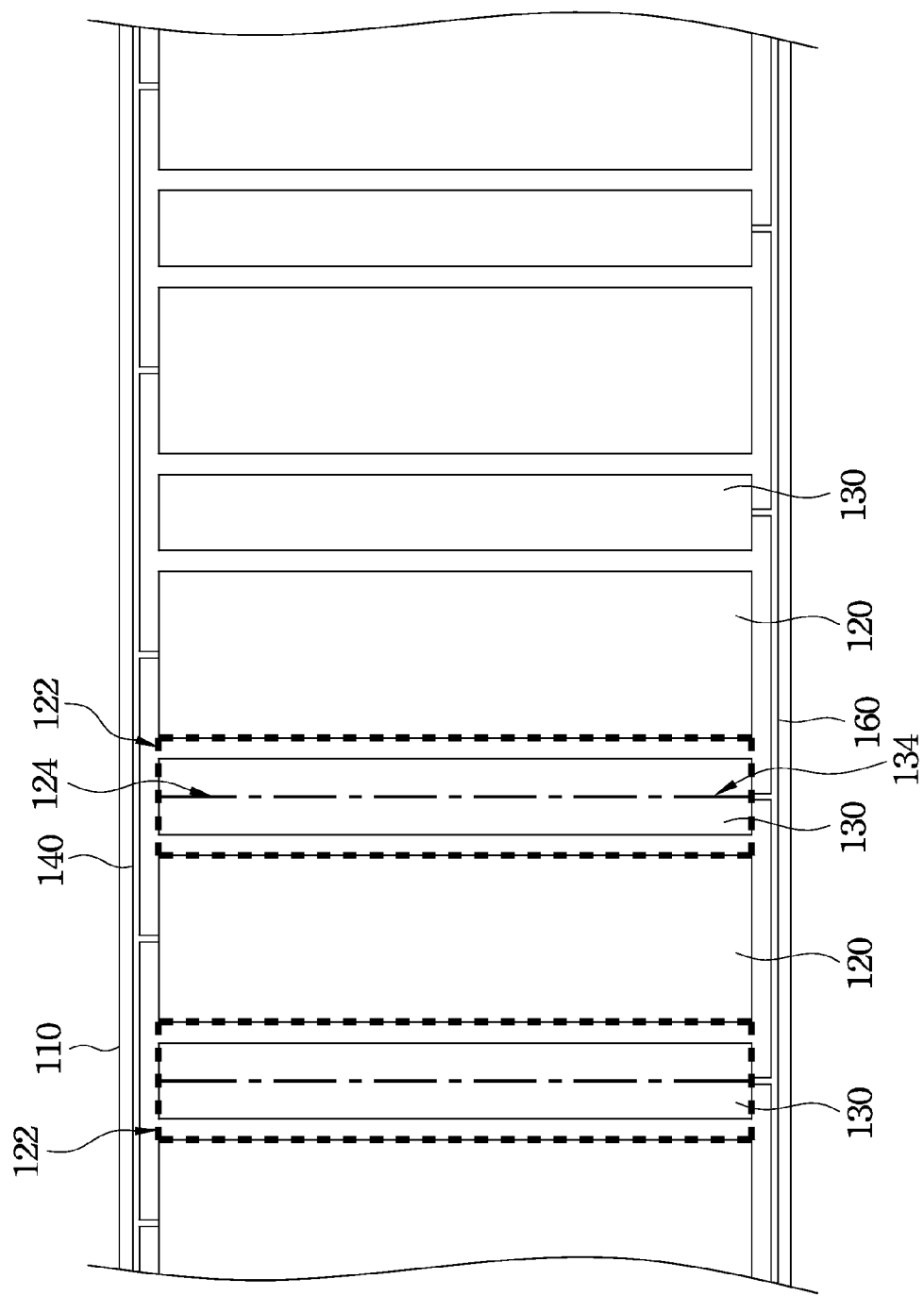
FIG. 2 is a bottom view of a first substrate in FIG. 1.
Figure 4A:
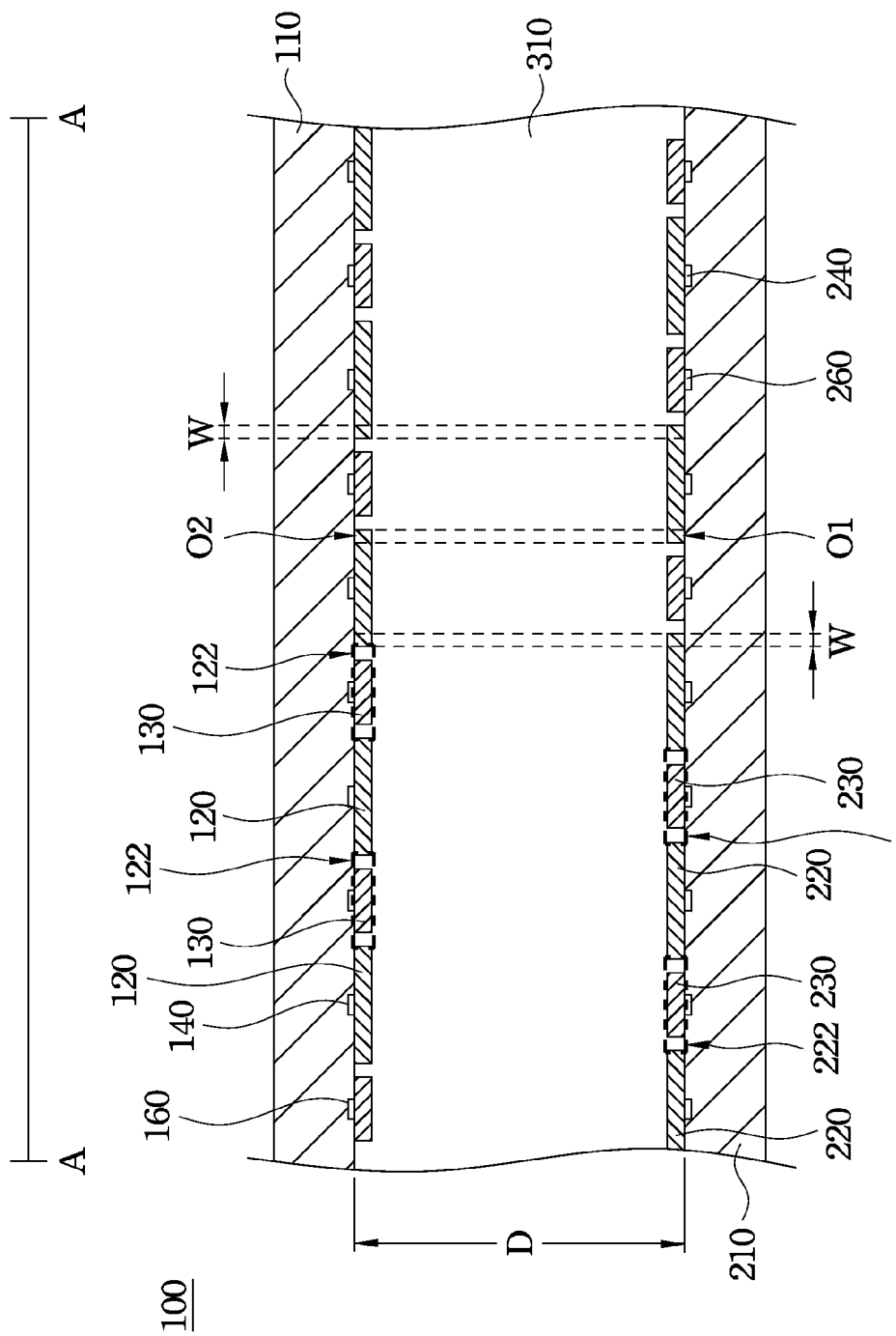
FIG. 4A is a cross-sectional view taken along line A-A in FIG. 1 according to one embodiment of the invention.

References are made to both of FIGS. 1 and 2. FIG. 1 is a schematic view of a liquid crystal lens 100 according to one embodiment of the invention, and FIG. 2 is a bottom view of a first substrate 110 in FIG. 1. The liquid crystal lens 100 includes the first substrate 110, a second substrate 210, a liquid crystal layer 310, a plurality of first main electrodes 120, and a plurality of second main electrodes 220. The second substrate 210 is disposed opposite to the first substrate 110. The liquid crystal layer 310 is disposed between the first substrate 110 and the second substrate 210. The first main electrodes 120 are disposed on a surface of the first substrate 110 adjacent to the liquid crystal layer 310. Any two adjacent first main electrodes 120 define a first gap 122 therebetween. Referring next to FIGS. 1 and 3 at the same time, wherein FIG. 3 is a top view of the second substrate 210 in FIG. 1. The second main electrodes 220 are disposed on a surface of the second substrate 210 adjacent to the liquid crystal layer 310. Any two adjacent second main electrodes 220 define a first gap 222 therebetween. Referring next to FIG. 4A, wherein FIG. 4A is a cross-sectional view taken along line A-A in FIG. 1 according to one embodiment of the invention. A vertical projection of each first main electrode 120 on a surface of the second substrate 210 overlaps two adjacent second main electrodes 220 to form two overlapping portions O1 of the two adjacent second main electrodes 220, respectively. Moreover, a vertical projection of each second main electrode 220 on a surface of the first substrate 110 overlaps two adjacent first main electrodes 120 to form two overlapping portions O2 of the two adjacent first main electrodes 120, respectively.

As a result, when one electric field is applied between the first main electrodes 120 and the second main electrodes 220, the orientations of liquid crystal molecules in the liquid crystal layer 310 is changed due to the electric field, so that the refractive index distribution of the liquid crystal layer 310 is similar to that of a physical lens. In particular, normal directions of the first substrate 110 and the second substrate 210 are defined as a vertical direction, while extension directions of the first substrate 110 and the second substrate 210 are defined as a horizontal direction. In the case of applying the electric field, the electric field between the first substrate 110 and the second substrate 210 at an area between the overlapping portions O1 and O2 is different from that at other areas. A strongest vertical electric field exists between the overlapping portions O1 and O2. The farther away the vertical electric field intensity exists from the space formed between the overlapping portions O1 and O2, the weaker it becomes. The refractive index of the liquid crystal molecule under the vertical electric field is defined as a first refractive index, while the refractive index of the liquid crystal molecules under a horizontal electric field is defined as a second refractive index. Therefore, the liquid crystal molecules between the overlapping portions O1 and O2 have the first refractive index. As the liquid crystal molecules are located outside the area between the overlapping portions O1 and O2, the liquid crystal molecules are gradually changed to have the second refractive index. As a result, via the aforementioned arrangement manners of the first main electrodes 120 and the second main electrodes 220, the whole liquid crystal layer 310 can generate a refractive index distribution similar to that of the physical lens.

Additionally, in this embodiment, the first main electrodes 120 and the second main electrodes 220 both are strip-shaped, and are respectively disposed on the first substrate 110 and the second substrate 210 along a linear direction. That is, the first main electrodes 120 and the second main electrodes 220 and even a refractive index distribution of the liquid crystal layer 310 all belong to a one-dimensional array arrangement. However, the aforementioned arrangement manners are illustrative only, and should not be intended to limit the invention. A person having ordinary skills in the art may design the arrangement manners of the first main electrodes 120 and the second main electrodes 220 according to real requirements.

The aforementioned overlapping portions O1 and O2 respectively have one overlapping width W. The overlapping width W meets the following conditions:

$$0\ \mu m \leq W \leq 50\ \mu m, \text{ preferably } 0\ \mu m \leq W 30\ \mu m.$$

If no overlapping portion O1 exists in the first main electrodes 120 and/or no overlapping portion O2 exists in the second main electrodes 220, the arrangement direction of the liquid crystal molecules cannot be changed effectively. Whereas, if the overlapping width W is too wide (for example, greater than 50 μm), both of spectral effect and imaging effect of the liquid crystal lens are affected adversely. In one or more embodiments, it may be chosen to make the overlapping width W of either of the overlapping portions O1 and O2 the same, but the invention is not limited to this.

The aforementioned electric field between the first main electrodes 120 and the second main electrodes 220 is generated by applying different voltages on the first main electrodes 120 and the second main electrodes 220 respectively. In particular, returning to FIGS. 1, 2 and 3, the liquid crystal lens 100 further includes at least one first main wire 140, at least one second main wire 240, a first main voltage source 150, and a second main voltage source 250. The first main wire 140 is disposed on the first substrate 110, and is electrically connected to the first main electrodes 120 (see FIG. 2). Moreover, the second main wire 240 is disposed on the second substrate 210, and is electrically connected to the second main electrodes 220 (see FIG. 3). Typically, the first main wire 140 and the second main wire 240, for example, are disposed at edges of the first substrate 110 and the second substrate 210, and then are wired respectively to each of the first main electrodes 120 and each of the second main electrodes 220. However, the invention is not limited to this. The first main voltage source 150 and the second main voltage source 250 are electrically connected to the first main wire 140 and the second main wire 240 respectively, which are used for making the first main electrodes 120 have a first main voltage and for making the second main electrodes 220 have a second main voltage respectively through the first main wire 140 and the second main wire 240. A first voltage difference exists between the first main voltage and the second main voltage. This first voltage difference is a source of the electric field between the first substrate 110 and the second substrate 210. Moreover, the first voltage difference is about 0 V to ±30 V, preferably 0 V to ±20 V.

In one or more embodiments, as shown in FIG. 4A, the size of the first main electrode 120 may be the same as the size of the second main electrode 220, while the size of the first gap 122 may also be the same as that of the second gap 222. That is, although in the liquid crystal lens 100, the first main electrodes 120 are not aligned to the second main electrodes 220 in position at the vertical direction, a pattern arrangement of the first main electrodes 120 on the first substrate 110 is substantially the same as that of the second main electrodes 220 on the second substrate 210. Therefore, by providing only one photomask, a manufacturer can respectively manufacture the first main electrodes 120 and the second main electrodes 220 with a greatly reduced manufacturing cost. Additionally, a gap D between the first substrate 110 and the second substrate 210 is about 1 μm to 50 μm, but the invention is not limited to this.

The refractive index distribution of the liquid crystal layer 310 of the aforementioned liquid crystal lens 100 in the case of applying the electric field may be approximate to that of the physical lens. However, if the first voltage difference continues to increase, a rate of electric field change may be too large for the liquid crystal layer 310 at the edge of the area between the overlapping portions O1 and O2, so that the refractive index distribution of the liquid crystal layer 310 at a space coordinate may be approximate to a square wave curve, which makes the liquid crystal lens 100 cannot reach the effect as the physical lens instead.

References are made back to FIGS. 2 and 3. In one or more embodiments, the liquid crystal lens 100 may further include a plurality of first auxiliary electrodes 130 and a plurality of second auxiliary electrodes 230. The first auxiliary electrodes 130 each are located in the first gap 122. However, the first auxiliary electrodes 130 and the first main electrodes 120 are not contacted to each other, and the size of each of the first main electrodes 120 is greater than the size of each of the first auxiliary electrodes 130. Similarly, the second auxiliary electrodes 230 each are located in the second gap 222. However, the second auxiliary electrodes 230 and the second main electrodes 220 are not contacted to each other, and the size of each of the second main electrodes 220 is greater than the size of each of the second auxiliary electrodes 230.

Reference is made to FIG. 4A. When in the case of applying the electric field on the liquid crystal lens 100, one electric field exists between the first auxiliary electrodes 130 and the second main electrodes 220, while another electric field also exists between the second auxiliary electrodes 230 and the first main electrodes 120. This two electric fields may be used for mitigating the rate of electric field change of the liquid crystal layer 310 at the edge of the area between the overlapping portions O1 and O2, so that a change of a spatial arrangement direction of the liquid crystal molecules at the edge of the area between the overlapping portions O1 and O2 may be more gradual, so as to make the refractive index distribution presented by the liquid crystal layer 310 further fit with that of the physical lens.

In particular, since a second voltage difference between the first auxiliary electrodes 130 and the second main electrodes 220 is smaller than the aforementioned first voltage difference, the liquid crystal molecules in the area corresponding to the first voltage difference and the second voltage difference have different arrangement directions. Additionally, since one electric field with a curve form exists between the first main electrodes 120 and the adjacent first auxiliary electrodes 130, this electric field contributes to convert the electric field in the vertical direction between the overlapping portions O1 and O2 gradually into the electric field in the horizontal direction, an acute angle of the aforementioned square wave curve may approach smooth, so that the refractive index distribution presented by the liquid crystal layer 310 further fits with that of the physical lens. Moreover, since an assistant action of the second auxiliary electrodes 230 is the same as that of the first auxiliary electrodes 130, it is not described any further.

Reference is made back to FIG. 1. Similarly, the aforementioned electric field is generated also by respectively applying different voltages on the first auxiliary electrodes 130 and the second auxiliary electrodes 230. In particular, as shown in FIGS. 1 to 3, the liquid crystal lens 100 further includes at least one first auxiliary wire 160, at least one second auxiliary wire 260, a first auxiliary voltage source 170, and a second auxiliary voltage source 270. The first auxiliary wire 160 is disposed on the first substrate 110, and is electrically connected to the first auxiliary electrodes 130 (see FIG. 2). Moreover, the second auxiliary wire 260 is disposed on the second substrate 210, and is electrically connected to the second auxiliary electrodes 230 (see FIG. 3). Typically, the first auxiliary wire 160 and the second auxiliary wire 260 may be disposed respectively at the edges of the first substrate 110 and the second substrate 210, and then are wired respectively to each of the first auxiliary electrodes 130 and each of the second auxiliary electrodes 230. However, the invention is not limited to this. The first auxiliary voltage source 170 and the second auxiliary voltage source 270 each are electrically connected to the first auxiliary wire 160 and the second auxiliary wire 260, which are used for making the first auxiliary electrodes 130 have a first auxiliary voltage and for making the second auxiliary electrodes 230 have a second auxiliary voltage respectively through the first auxiliary wire 160 and the second auxiliary wire 260. The second voltage difference exists between the first auxiliary voltage and the aforementioned second main voltage, and the third voltage difference exists between the second auxiliary voltage and the aforementioned first main voltage.

Reference is made back to FIG. 4A. A value of the aforementioned first voltage difference is greater than that of the second voltage difference and the third voltage difference. That is, the electric field intensity of the liquid crystal layer 310 between the overlapping portions O1 and O2 is greater than the electric field intensity in other areas, wherein the electric field in this area is mainly used for providing a liquid crystal molecule deflection. Moreover, the rate of electric field change at the edge of the area between the overlapping portions O1 and O2 may be slowed down due to the second voltage difference and the third voltage difference. Therefore, the rate of orientation change of the liquid crystal molecules may also be smooth, so as to reach the effect as the physical lens. In the case that the first auxiliary electrodes 130 and the second auxiliary electrodes 230 are used for assisting, the first voltage difference may be selected as 0 V to ±30 V, preferably 0 V to ±20 V, while the second voltage difference and the third voltage difference may be selected as about 0 V to ±20 V, preferably 0 V to ±10 V.

It should be noted that, although both of the first main wire 140 and the second auxiliary wire 260 in this embodiment are located at the same side of the liquid crystal lens 100, however, this kind of arrangement manner is not intended to limit the invention. In other embodiments, the first main wire 140 and the second main wire 240 may also select to be located at the same side of the liquid crystal lens 100, and the first auxiliary wire 160 and the second auxiliary wire 260 may be located at the same side of the liquid crystal lens 100. As long as the first main wire 140, the second main wire 240, the first auxiliary wire 160, and the second auxiliary wire 260 are able to connect the first main electrodes 120, the second main electrodes 220, the first auxiliary electrodes 130, and the second auxiliary electrodes 230 respectively, those of skills in the art may design elastically the arrangement manner of the aforementioned wires according to real requirements.

Figure 4B:
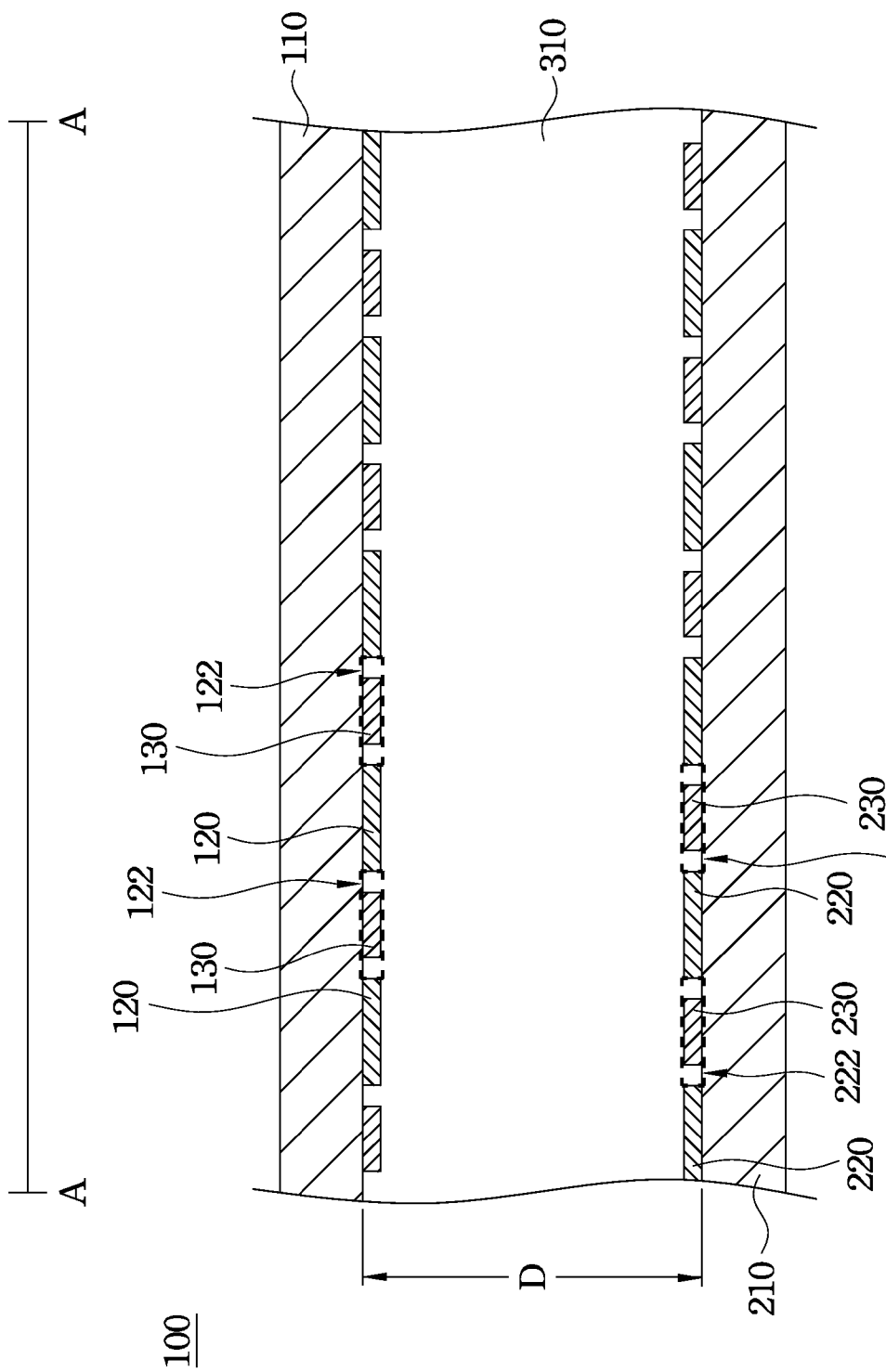
FIG. 4B is a cross-sectional view taken along line A-A in FIG. 1 according to another embodiment of the invention.

Reference is made to FIG. 4B, which is a cross-sectional view taken along line A-A in FIG. 1 according to another embodiment of the invention. The difference between the liquid crystal lenses 100 in FIG. 4A and in FIG. 4B are the value of the overlapping width W, and the positions of the first main wire 140, the first auxiliary wire 160, the second main wire 240, and the second auxiliary wire 260 (all are indicated in FIG. 4A). In this embodiment, the overlapping width W is 0, which means the vertical projection of each first main electrode 120 on the surface of the second substrate 210 is adjacent to two adjacent second main electrodes 220, and the vertical projection of each second main electrode 220 on the surface of the first substrate 110 is adjacent to two adjacent first main electrodes 120. The arrangement direction of the liquid crystal molecules can be changed effectively when W=0.

In this embodiment, the first main wire 140 and the first auxiliary wire 160 (all are indicated in FIG. 1) are connected to the first main electrode 120 and the first auxiliary electrode 130, respectively, except being embedded in the first substrate 110. In other words, the first main electrode 120, the first auxiliary electrode 130, the first main wire 140, and the first auxiliary wire 160 are formed by the same layer. For example, a conductive layer can be disposed on the first substrate 110 firstly, and then the conductive layer can be patterned to form the first main electrode 120, the first auxiliary electrode 130, the first main wire 140, and the first auxiliary wire 160 on the first substrate 110. Therefore, since the first main electrode 120, the first auxiliary electrode 130, the first main wire 140, and the first auxiliary wire 160 are formed in only one lithography process, the cost and fabrication time can be reduced. Similarly, the second main electrode 220, the second auxiliary electrode 230, the second main wire 240, and the second auxiliary wire 260 are formed by the same layer. For example, a conductive layer can be disposed on the second substrate 210 firstly, and then the conductive layer can be patterned to form the second main electrode 220, the second auxiliary electrode 230, the second main wire 240, and the second auxiliary wire 260 on the second substrate 210. As to other relevant structures, materials and process details are all the same as the embodiment shown in FIG. 4A, and, therefore, these are not repeated hereinafter.

Figure 5:
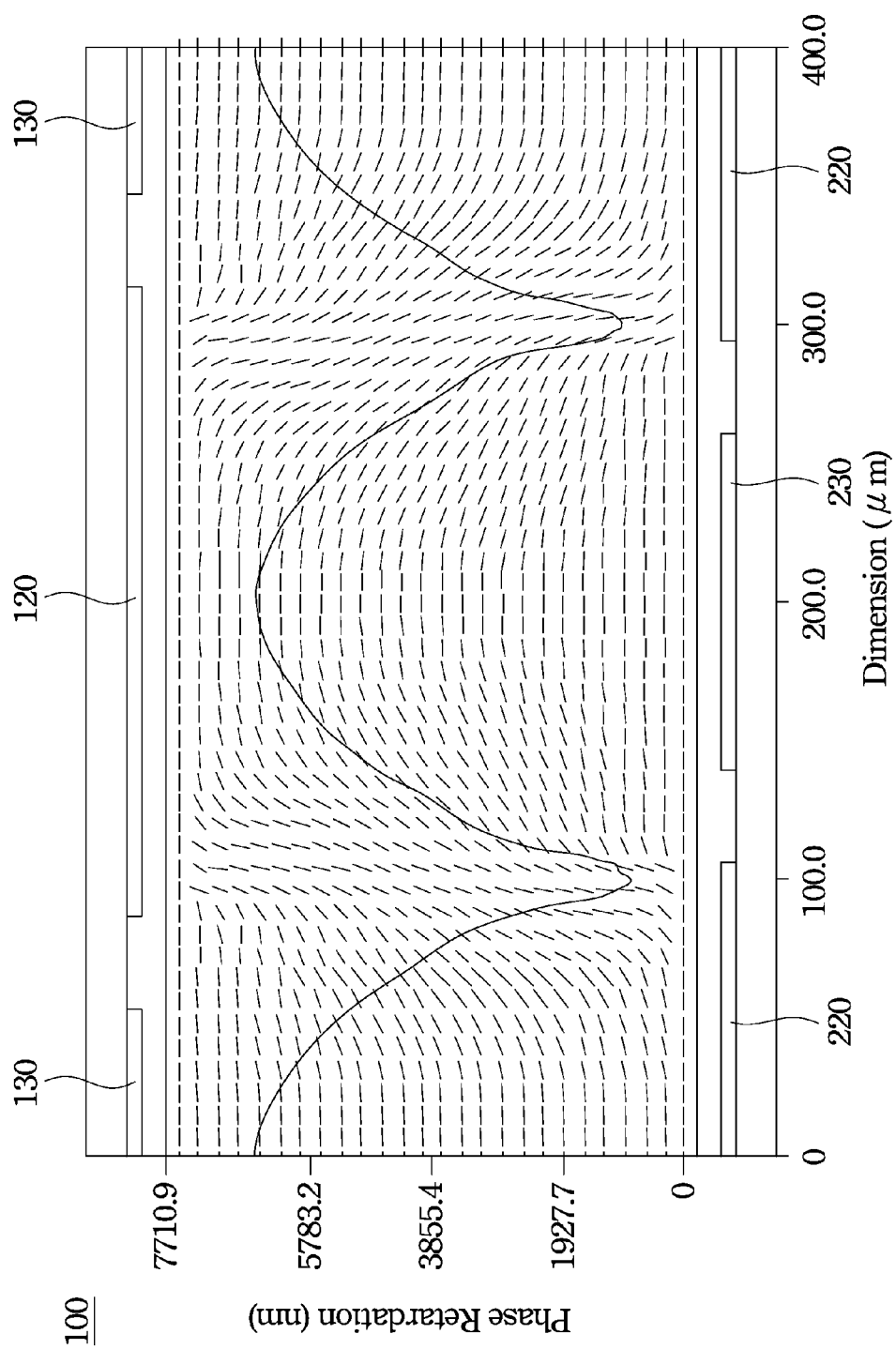
FIG. 5 is a schematic liquid crystal distribution view of the liquid crystal lens of one example of the invention and a refractive index distribution curve thereof.

Reference is made to FIG. 5, which is a schematic liquid crystal distribution view of the liquid crystal lens 100 of one example of the invention and a refractive index distribution curve thereof. An abscissa is the space coordinate along the linear direction, while an ordinate is a phase retardation of the liquid crystal molecules. For the purpose of clearness, all the liquid crystal molecules in the figure are represented by "–", and a rotating direction of these "–" correspond to the orientations of the liquid crystal molecules. In this example, the widths of the first main electrodes 120 and the second main electrodes 220 along the linear direction are 210 μm. For the purpose of clear illustration, only two second main electrodes 220 with a half width (105 μm) are shown in FIG. 5. Both of the widths of the first gap 122 and the second gap 222 (as marked in FIG. 4A) along the linear direction are 190 μm, and the widths of the first auxiliary electrodes 130 and the second auxiliary electrodes 230 along the linear direction are 120 μm. For the purpose of clear illustration, only two first auxiliary electrodes 130 with a half width (60 μm) are shown in FIG. 5. The first auxiliary electrodes 130 and the adjacent two first main electrodes 120 are spaced respectively at a substantial same distance of 35 μm, while the second auxiliary electrodes 230 and the adjacent two second main electrodes 220 are spaced respectively at the substantial same distance of 35 μm. A gap D between the first substrate 110 and the second substrate 210 is about 25 μm. The first main voltage is 13.5 V, and the second main voltage is 0 V, that is, the first voltage difference is 13.5 V. The first auxiliary voltage is 1.5 V, and the second auxiliary voltage is 12 V, that is, the second voltage difference and the third voltage difference both are 1.5 V.

It can be seen from the figure that, the liquid crystal molecules may be affected mainly by the first voltage difference. That is, the orientations of the liquid crystal molecules located between the overlapping portions O1 and O2 (see FIG. 4A) in the liquid crystal layer 310 is roughly the vertical direction, and have the first refractive index. However, since the second voltage difference and the third voltage difference both are smaller than the first voltage difference, as the liquid crystal molecules are located outside the area between overlapping portions O1 and O2, the liquid crystal molecules are converted gradually into the horizontal direction and converted gradually into the second refractive index. With the assistance of the first auxiliary electrodes 130 and the second auxiliary electrodes 230, the rate of orientation change of the liquid crystal molecules located at the edge of the area between the overlapping portions O1 and O2 in the liquid crystal layer 310 is more gradual. Therefore, a spatial distribution of the refractive index presented by the refractive index distribution curve also fits with that of the physical lens relatively without presenting the square curve.

Additionally, for the traditional liquid crystal lens, a partial electric field direction at the edge of its electrodes may be opposite to a robbing direction of the substrate. As a result, it is easy to generate the disclination line between the liquid crystal molecules, so as to affect lens quality. However, the refractive index distribution curve of the liquid crystal lens 100 in this example shows that, no disclination line is generated in the liquid crystal lens 100 constituted of this kind of electrode arrangement manner. Therefore, it can be proven that, the liquid crystal lens 100 in this example has better lens quality than the conventional liquid crystal lens.

It should be noted that, though structural parameters of the aforementioned various electrodes and gaps are constant values, if the liquid crystal lens with other sizes needs to be designed actually, the structural parameters in the embodiment may be amplified or lessened linearly and slight size adjustment is superadded, so as to be suitable for other sizes. Therefore, the liquid crystal lens 100 of one embodiment of the invention may be used for improving the conventional liquid crystal lens, which adjusts a disadvantage of the size of the electrode according to the size the lens.

Figure 6:
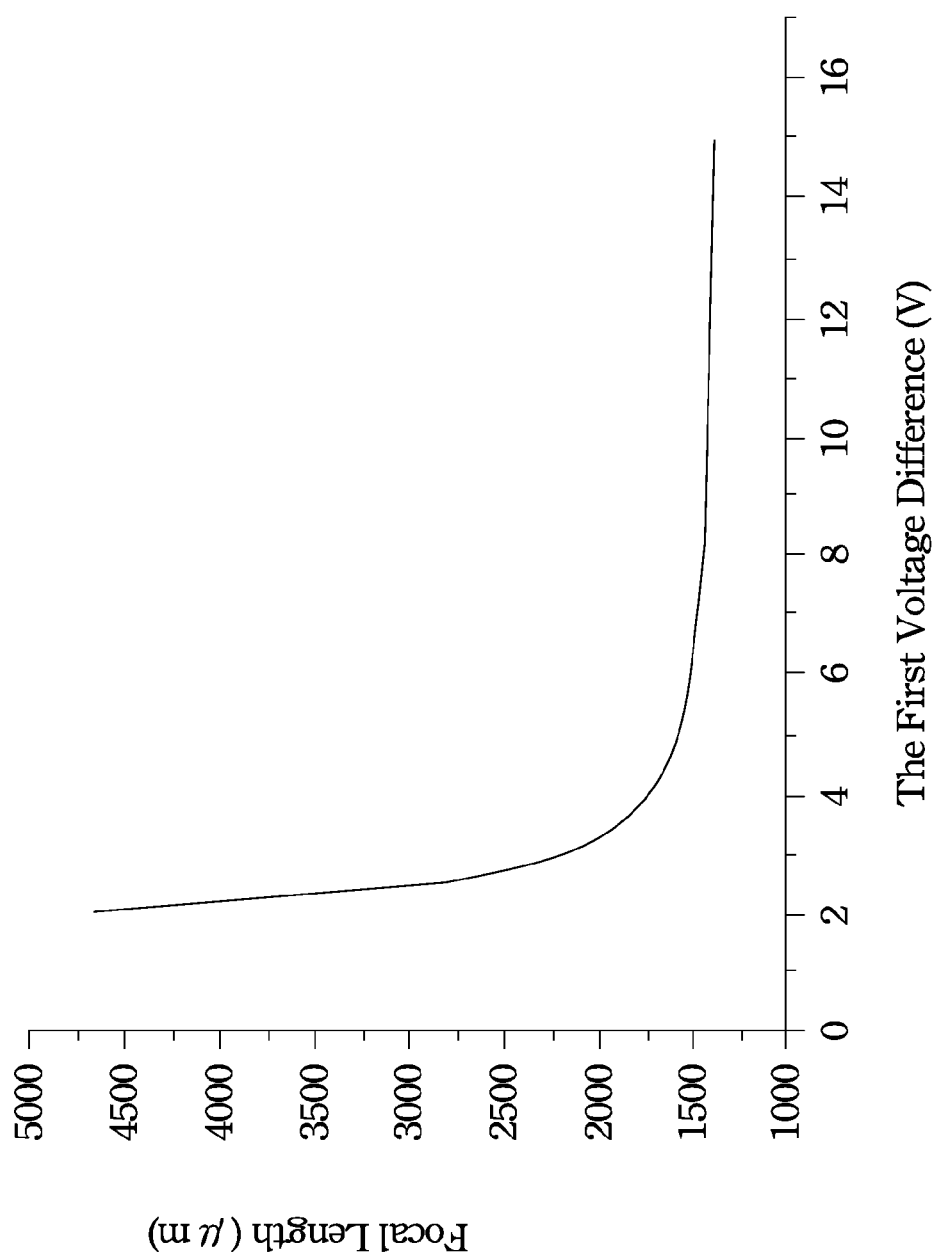
FIG. 6 is a relation curve of a focal length of lens of the liquid crystal lens in FIG. 5 and a first voltage difference.

Reference is made to FIG. 6, which is a relation curve of a focal length of lens of the liquid crystal lens 100 in FIG. 5 and the first voltage difference. Since the conventional liquid crystal lens is subjected to the refractive index distribution curve presented by itself, even though a driving voltage is changed, an available focal length scope thereof is also small. However, in this example, when the first voltage difference is changed from 2 V to 14 V, the focal length of the liquid crystal lens 100 may be changed from 4500 μm to 1500 μm. What is more, when the focal length of the liquid crystal lens 100 is about 1500 μm to 2000 μm, the refractive index distribution thereof still roughly fits with that of the physical lens. In view of the above, the liquid crystal lens 100 in this example may be used for improving zoom capability of the conventional liquid crystal lens greatly.

Reference is made back to FIG. 2. In this embodiment, each of the first gaps 122 has a first gap center 124, while the first auxiliary electrode 130 placed therein has one first auxiliary electrode center 134. The gap center and the electrode center indicated in this embodiment are virtual planes, which will be described in detail below. The positions of the first auxiliary electrode center 134 and the first gap center 124 coincide substantially. In particular, the first gap center 124 refers to a central plane of the first gap 122. The central plane of the first gap 122 and two sides of the first main electrodes 120 adjacent to the first gap 122 are spaced at an equal distance in the horizontal direction. The first auxiliary electrode center 134 refers to the central plane of the first auxiliary electrode 130. The central plane of the first auxiliary electrode 130 and two opposite sides of the first auxiliary electrode 130 next to the first main electrodes 120 are spaced at the equal distance in the horizontal direction. Reference is made to FIG. 3. Similarly, each second gap 222 has one second gap center 224, while the second auxiliary electrode 230 placed therein has one second auxiliary electrode center 234. The positions of the second auxiliary electrode center 234 and the second gap center 224 coincide substantially. In particular, the second gap center 224 refers to the central plane of the second gap 222. The central plane of the second gap 222 and two sides of the second main electrodes 220 adjacent to the second gap 222 are spaced at the equal distance in the horizontal direction. The second auxiliary electrode center 234 refers to the central plane of the second auxiliary electrode 230. The central plane of the second auxiliary electrode 230 and two opposite sides of the second auxiliary electrode 230 opposite to the second main electrode 220 are spaced at the equal distance in the horizontal direction.

Figure 7:
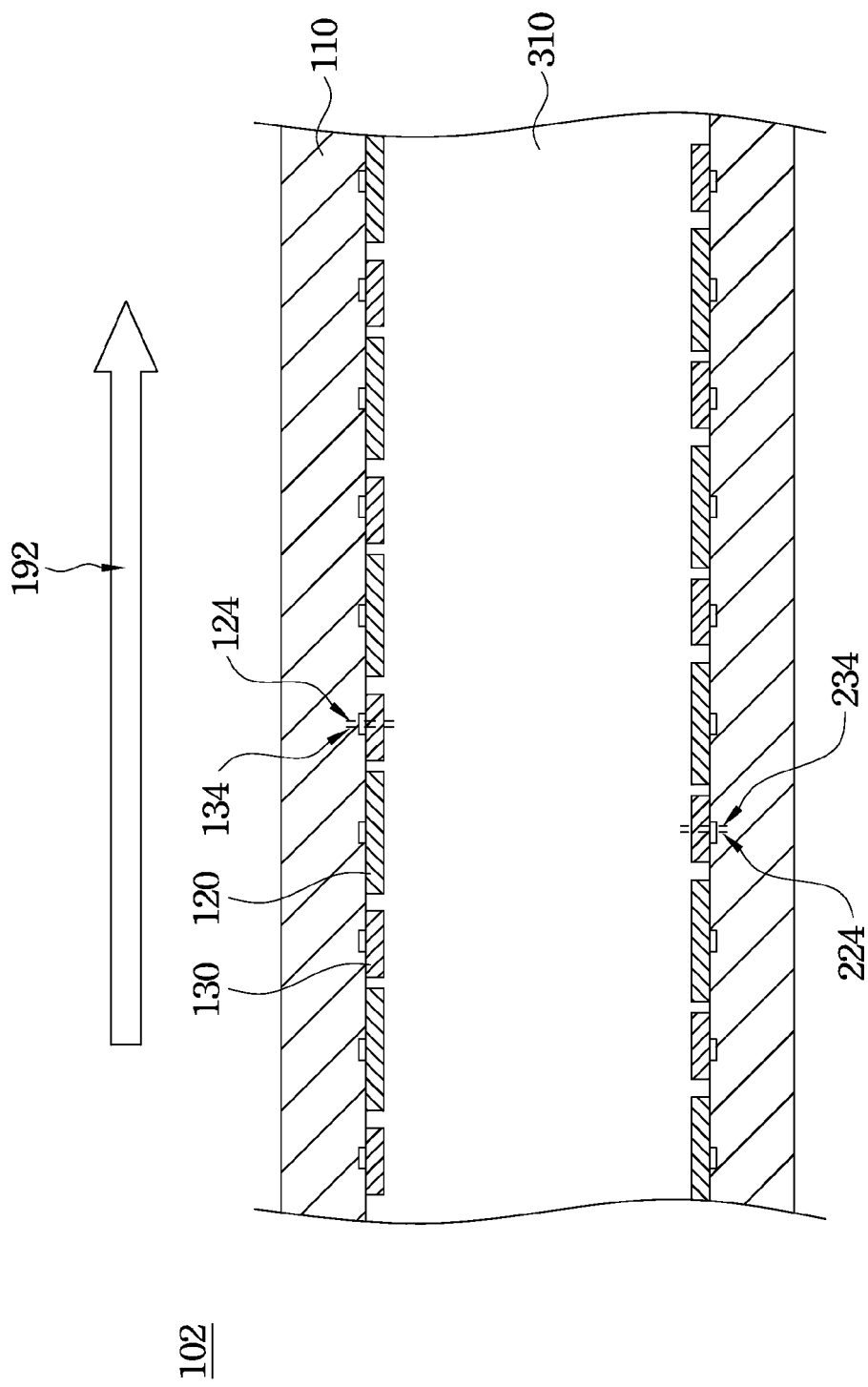
FIG. 7 is a cross-sectional view of the liquid crystal lens according to another embodiment of the invention.

However, the aforementioned arrangement manners are not intended to limit the invention. Reference is made to FIG. 7, which is a cross-sectional view of a liquid crystal lens 102 according to another embodiment of the invention. Taking the first substrate 110, the first main electrodes 120, and the first auxiliary electrodes 130 as an example, in order that the liquid crystal molecules in the liquid crystal layer 310 are able to arrange according to a predetermined direction, the robbing direction may be made in advance generally on the first substrate 110. In this embodiment, a robbing process is performed, for example, according to a robbing direction 192, so that the liquid crystal molecules are able to arrange according to the robbing direction 192. However, in the case of having the robbing direction, the refractive index distribution of the liquid crystal layer 310 may be affected by the robbing direction. For example, the refractive index distribution curve within a single cycle will become asymmetrical, that is, the spatial position at the largest refractive index may shift toward the robbing direction 192, and therefore the quality of the liquid crystal lens may also be affected. In this case, the fabricator may make the first auxiliary electrode center 134 shift from the first gap center 124. That is, the first auxiliary electrode 130 may be selected to shift toward the direction opposing to the robbing direction 192, so that an influence generated by the robbing direction for the liquid crystal molecules may be counteracted to enhance the quality of the liquid crystal lens. Similarly, the fabricator may also select to make the second auxiliary electrode center 234 shift from the second gap center 224, so as to reach the aforementioned purpose, which is not described any further here.

Figure 8:
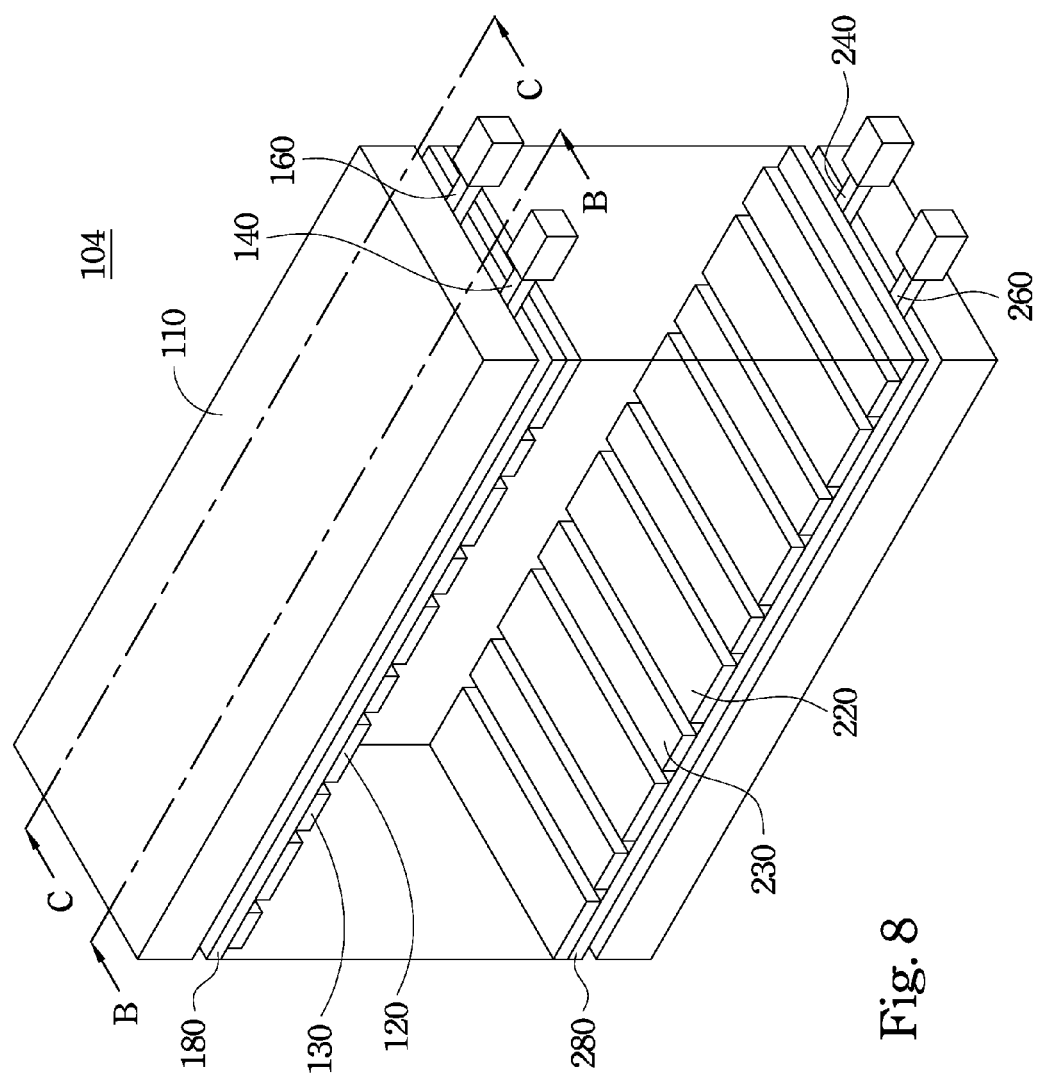
FIG. 8 is a schematic view of the liquid crystal lens according to another embodiment of the invention.
Figure 9:
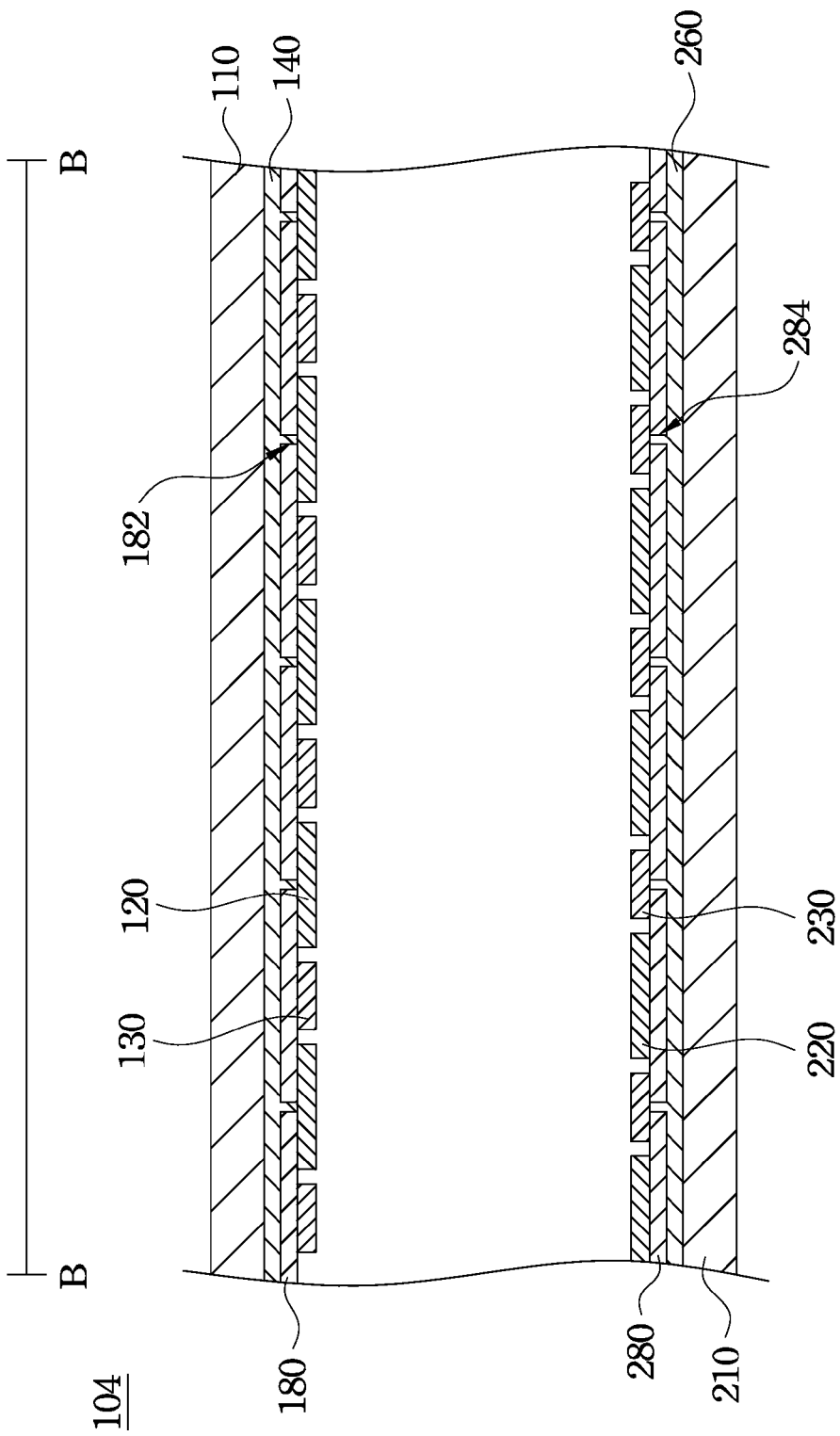
FIG. 9 is a cross-sectional view taken along line B-B in FIG. 8.

References are made to FIGS. 8 and 9. FIG. 8 is a schematic view of a liquid crystal lens 104 according to another embodiment of the invention, and FIG. 9 is a cross-sectional view taken along line B-B in FIG. 8. A difference between this embodiment and the embodiment in FIG. 1 lies in a wiring manner of the aforementioned wires, and the rest is the same, therefore, which is not described any further. The liquid crystal lens 104 may further include a first insulating layer 180 and a second insulating layer 280. The first insulating layer 180 is disposed between the first substrate 110 and the first main electrodes 120 and the first auxiliary electrodes 130, and the first insulating layer 180 has a plurality of first main through holes 182 formed therein. The first main wire 140 is disposed at one side of the first insulating layer 180 opposite to the first main electrodes 120 and the first auxiliary electrodes 130, and is electrically connected to the first main electrodes 120 via the first main through holes 182. Additionally, the second insulating layer 280 is disposed between the second substrate 210 and the second main electrodes 220 and the second auxiliary electrodes 230, and the second insulating layer 280 has a plurality of second auxiliary through holes 284 formed therein. The second auxiliary wire 260 is disposed at one side of the second insulating layer 280 opposite to the second main electrodes 220 and the second auxiliary electrodes 230, and is electrically connected to the second auxiliary electrodes 230 via the second auxiliary through holes 284.

Figure 10:
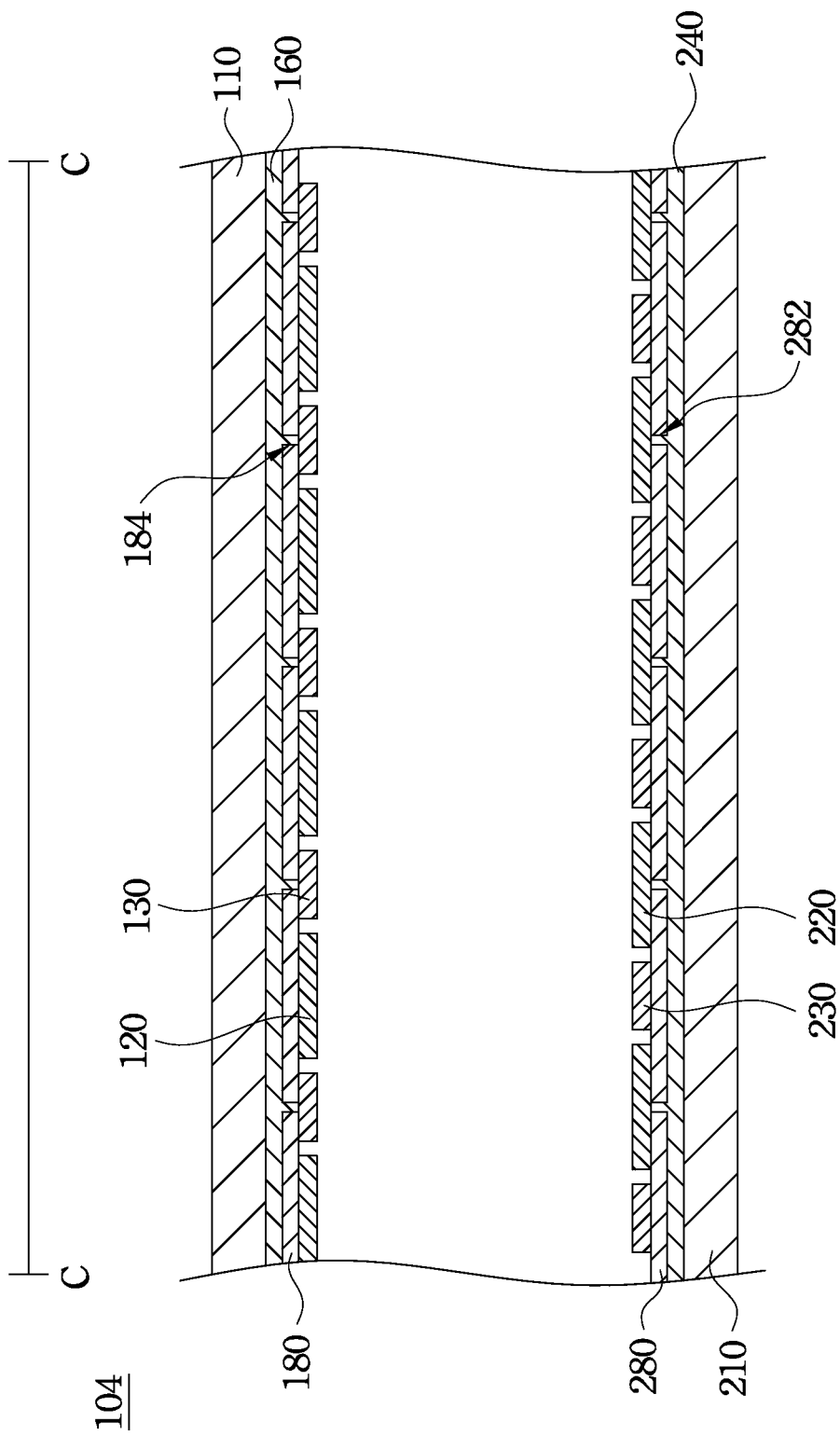
FIG. 10 is a cross-sectional view taken along line C-C in FIG. 8.

Additionally, references are made to FIGS. 8 and 10. FIG. 10 is a cross-sectional view taken along line C-C in FIG. 8. The first insulating layer 180 further has a plurality of first auxiliary through holes 184 formed therein. Moreover, the first auxiliary wire 160 is disposed at one side of the first insulating layer 180 opposite to the first main electrodes 120 and the first auxiliary electrodes 130, and is electrically connected to the first auxiliary electrodes 130 via the first auxiliary through holes 184. Additionally, the second insulating layer 280 has a plurality of second main through holes 282 formed therein. Moreover, the second main wire 240 is disposed at one side of the second insulating layer 280 opposite to the second main electrodes 220 and the second auxiliary electrodes 230, and is electrically connected to the second main electrodes 220 via the second main through holes 282. As a result, since all the aforementioned wires are embedded between the insulating layer and the substrate, the wires may be protected well without damage. For the liquid crystal lens 104 in the embodiment, details of the rest are the same as that of the embodiment in FIG. 1, which are not described any further.

Figure 11:
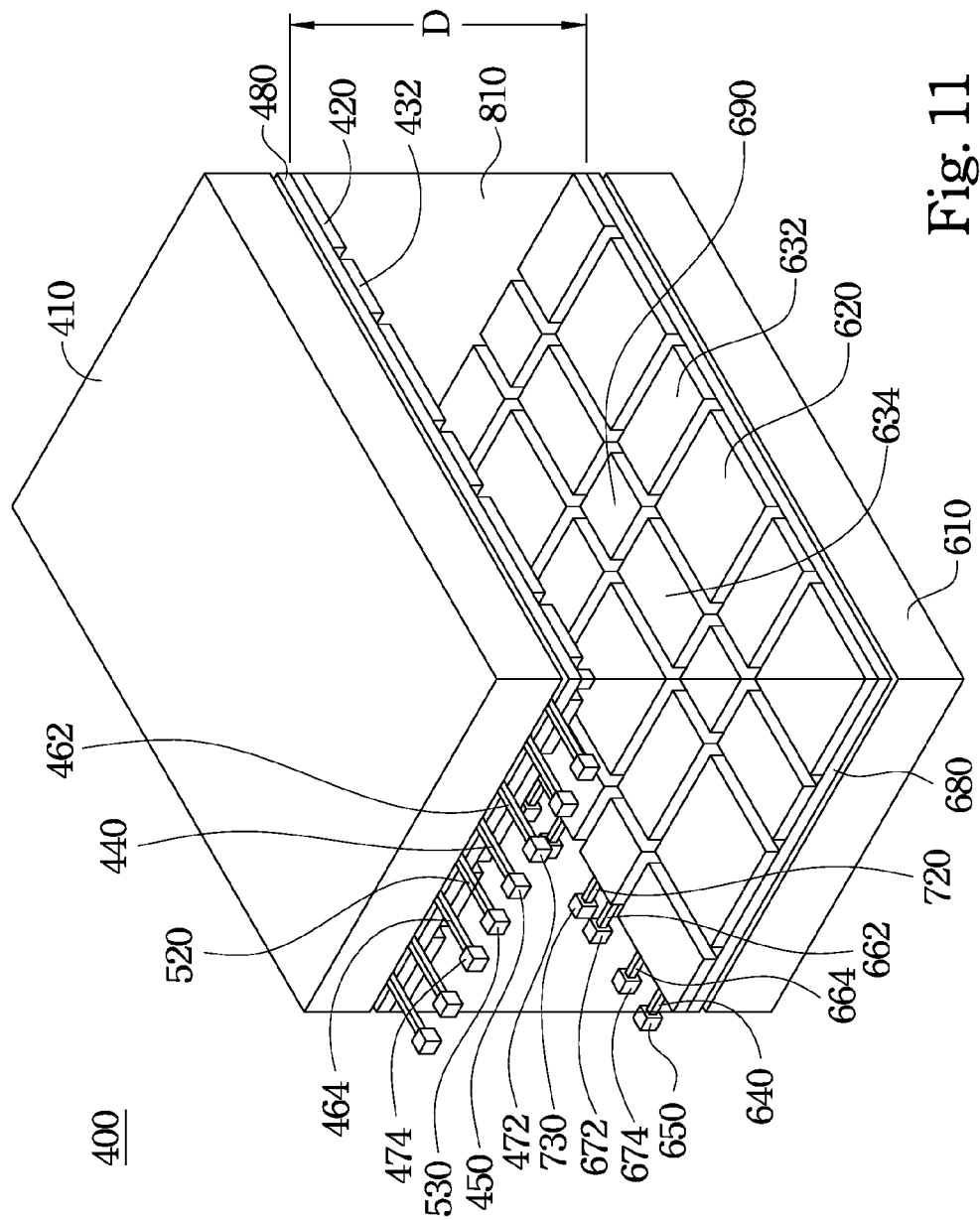
FIG. 11 is a schematic view of the liquid crystal lens according to another embodiment of the invention.
Figure 12:
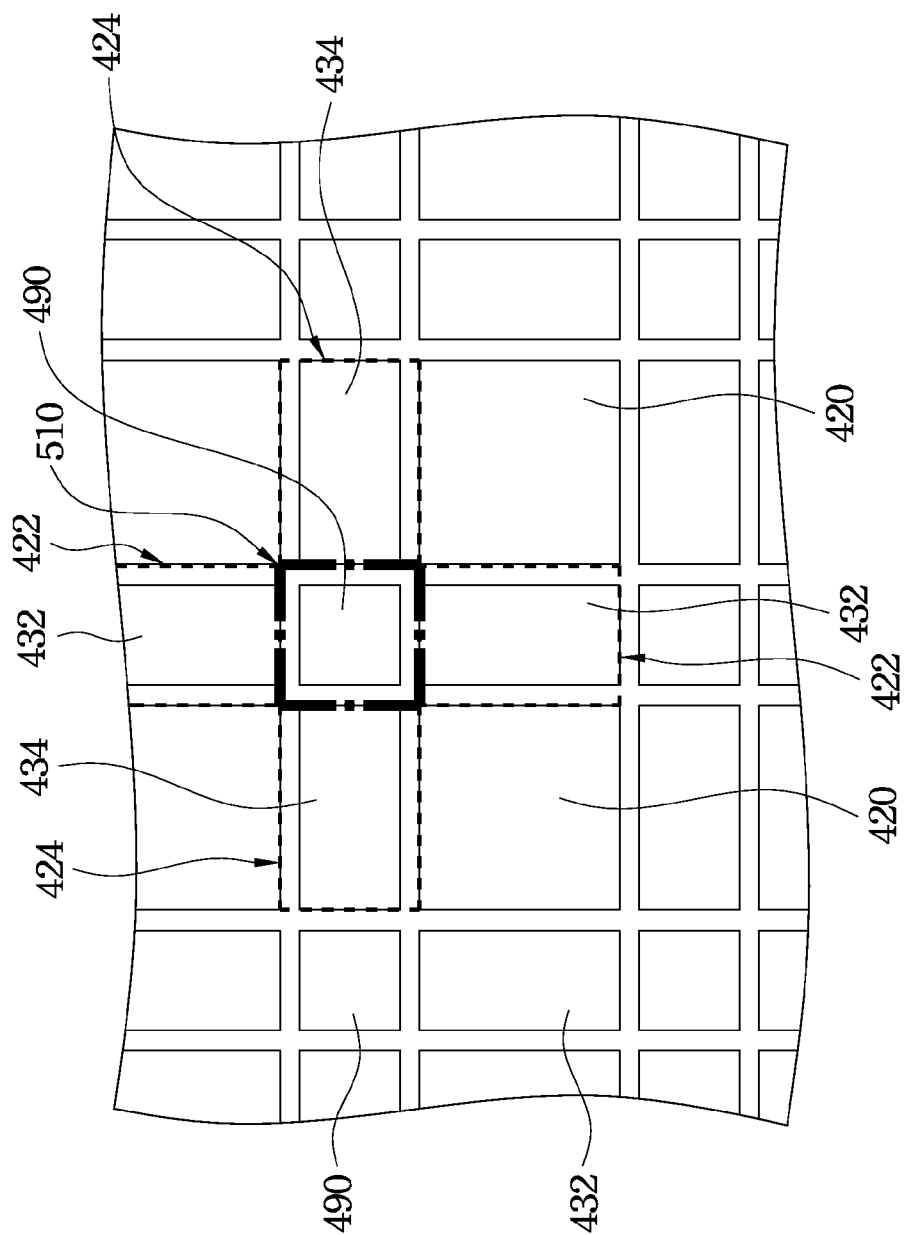
FIG. 12 is a bottom view of a first substrate in FIG. 11.

References are made to FIGS. 11 and 12. FIG. 11 is a schematic view of a liquid crystal lens 400 according to another embodiment of the invention, and FIG. 12 is a bottom view of a first substrate 410 in FIG. 11. The liquid crystal lens 400 includes the first substrate 410, a second substrate 610, a liquid crystal layer 810, a plurality of first main electrodes 420 and a plurality of second main electrodes 620. The second substrate 610 is disposed opposite to the first substrate 410. The liquid crystal layer 810 is disposed between the first substrate 410 and the second substrate 610. The first main electrodes 420 are disposed on the surface of the first substrate 410 adjacent to the liquid crystal layer 810. Any two adjacent first main electrodes 420 define a first gap 422 or 424 therebetween.

Figure 13:
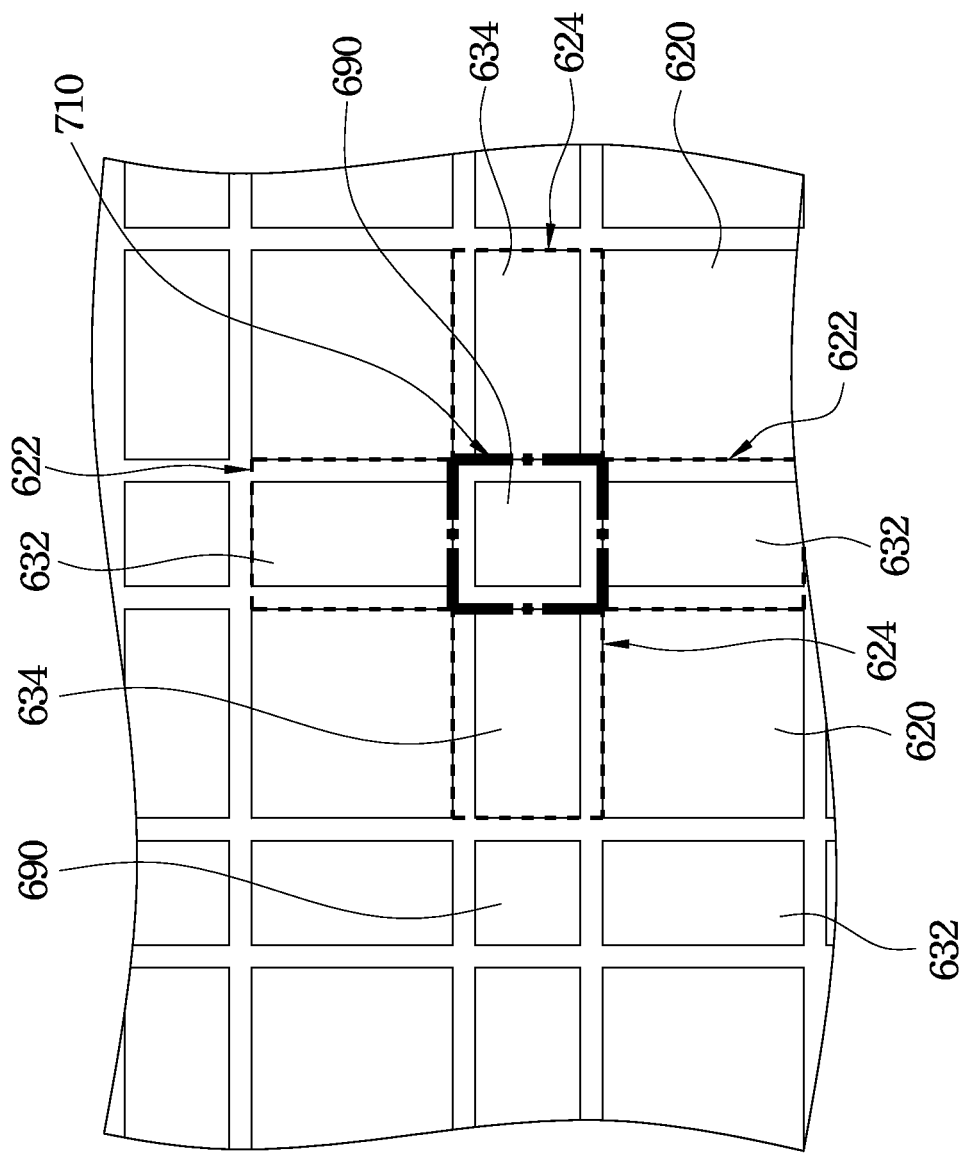
FIG. 13 is a top view of a second substrate in FIG. 11.

References are made to FIGS. 11 and 13. FIG. 13 is a top view of the second substrate 610 in FIG. 11. The second main electrodes 620 are disposed on the surface of the second substrate 610 adjacent to the liquid crystal layer 810. Any two adjacent second main electrodes 620 define a second gap 622 or 624 therebetween.

Figure 14:
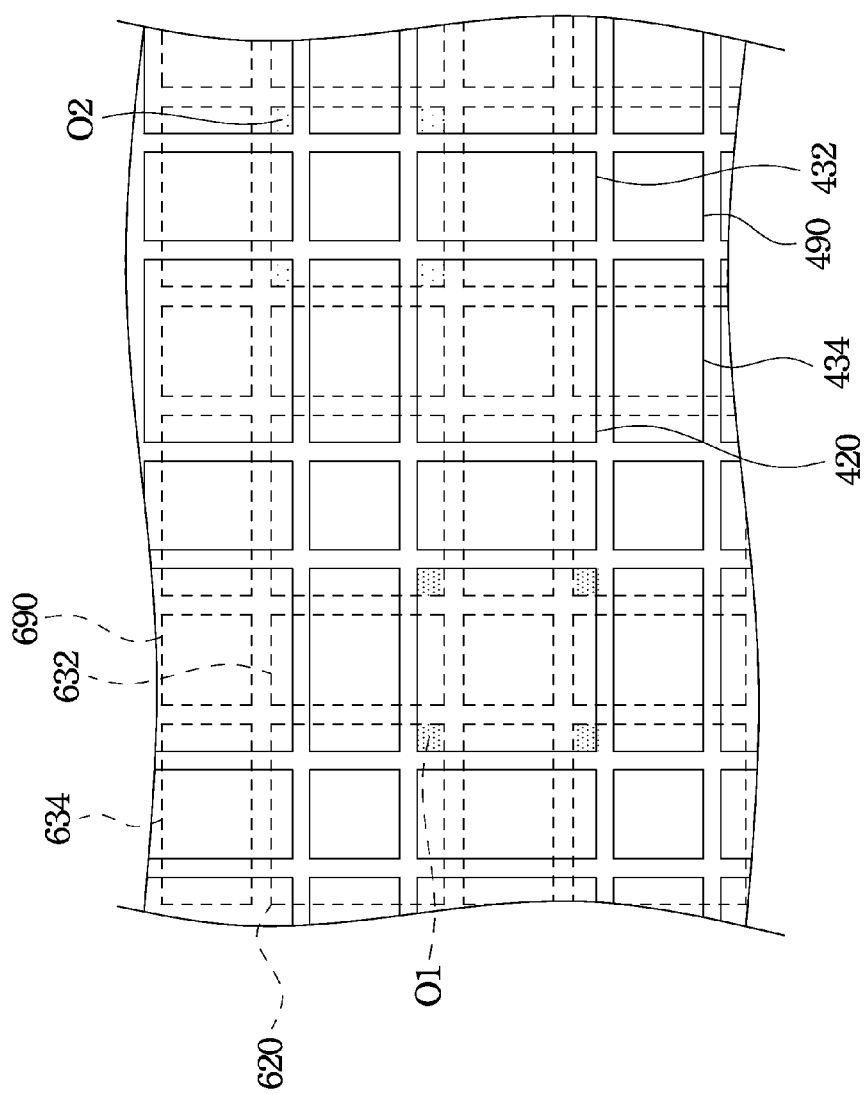
FIG. 14 is a perspective view of the liquid crystal lens in FIG. 11 observing from the first substrate toward to the second substrate.

Reference is made to FIG. 14, which is a perspective view of the liquid crystal lens 400 in FIG. 11 observing from the first substrate 410 toward to the second substrate 610. In the figure, for the purpose of clearness, solid lines represent an electrode profile on the first substrate 410 in FIG. 11, and dotted lines represent the electrode profile on the second substrate 610 in FIG. 11. A vertical projection of each first main electrode 420 on a surface of the second substrate 610 overlaps four adjacent second main electrodes 620 to form four overlapping portions O1 of the four adjacent second main electrodes 620. Moreover, a vertical projection of each second main electrode 620 on a surface of the first substrate 410 overlaps four adjacent first main electrodes 420 to form four overlapping portions O2 of the four adjacent first main electrodes 420, respectively. In the present embodiment, four overlapping portions O1 are formed by one second main electrode 620 and corresponding four first main electrodes 420, and four overlapping portions O2 are formed by one first main electrode 420 and corresponding four second main electrodes 620, for example. Reference is made back to FIG. 11. In this embodiment, the first main electrodes 420 and the second main electrodes 620 both are island-shaped, and are disposed on the first substrate 410 and the second substrate 610 respectively as arrays. That is, the first main electrodes 420 and the second main electrodes 620 and even the refractive index distribution of the liquid crystal layer 810 all belong to a two-dimensional array arrangement. Since the first main electrodes 420 and the second main electrodes 620 of the liquid crystal lens 400 in this embodiment both are the two-dimensional array arrangement, the liquid crystal lens 400 may be suitable for a stereo display in two orthogonal directions. That is, whether the liquid crystal lens 400 is used in a portrait manner or a landscape manner, as long as it cooperates with a suitable voltage configuration, one plane image may be used for generating a stereo effect.

References are made to FIGS. 12 and 13. In one or more embodiments, the size of the first main electrode 420 may be the same as the size of the second main electrode 620, while the sizes of the first gaps 422 and 424 may also be the same as that of the second gaps 622 and 624. That is, even though in the liquid crystal lens 400, the first main electrodes 420 is not aligned to the second main electrodes 620 at the position in the vertical direction, the pattern formed of the arrangement of the first main electrodes 420 on the first substrate 410 in FIG. 11 is substantially the same as the pattern formed of the arrangement of the second main electrodes 620 on the second substrate 610 in FIG. 11. Therefore, only one photomask needs to be provided by the fabricator, which may be used for respectively fabricating the first main electrodes 420 and the second main electrodes 620, and the fabricating cost may be reduced greatly. Additionally, a gap D (see FIG. 11) between the first substrate 410 and the second substrate 610 is about 40 μm, but the invention is not limited to this.

Reference is made to FIG. 14. The aforementioned overlapping portions O1 and O2 have one overlapping width W.

The overlapping width W may be a side length at any side of the overlapping portions O1 and O2, and the overlapping width W meets the following conditions:

0 µm≤W 50 µm, preferably 0 µ≤W 30 µm.

If no overlapping portion O1 exists in the first main electrodes 420 and/or no overlapping portion O2 exists in the second main electrodes 620, the orientations of the liquid crystal molecules cannot be changed effectively. Whereas, if the overlapping width W is too wide (for example, greater than 50 µm), both of the spectral effect and the imaging effect of the liquid crystal lens are affected adversely. In one or more embodiments, the choice may be done to make the overlapping width W of either of the overlapping portions O1 and O2 the same, but the invention is not limited to this.

The electric field between the aforementioned first main electrodes 420 and the second main electrodes 620 is generated by applying different voltages on the first main electrodes 420 and the second main electrodes 620 respectively.

Figure 15:
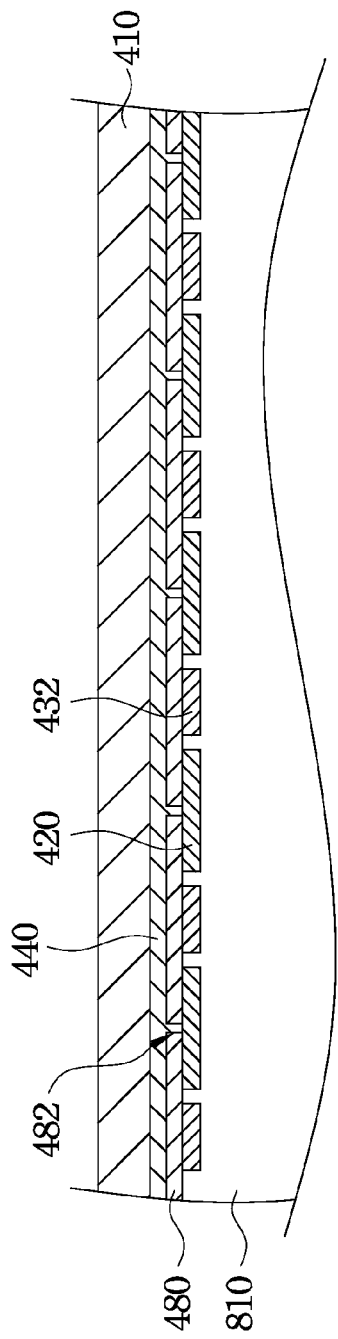
FIG. 15 is a cross-sectional view from the first substrate to a liquid crystal layer shown by making the extension direction of any first main wire in FIG. 11 as the cross-sectional line.

In particular, firstly references are made to FIGS. 11 and 15. FIG. 15 is a cross-sectional view from the first substrate 410 to the liquid crystal layer 810 shown by making the extension direction of any first main wire 440 in FIG. 11 as the cross-sectional line. The liquid crystal lens 400 further includes a first insulating layer 480, at least one first main wire 440, and a first main voltage source 450 (see FIG. 11). The first insulating layer 480 is disposed between the first substrate 410 and the first main electrodes 420, and the first insulating layer 480 has a plurality of first main through holes 482 formed therein. The first main wire 440 is disposed at one side of the first insulating layer 480 opposite to the first main electrodes 420, and is electrically connected to the first main electrodes 420 via the first main through holes 482. The first main voltage source 450 is electrically connected to the first main wire 440 for making the first main electrodes 420 have a first main voltage through the first main wire 440.

Figure 16:
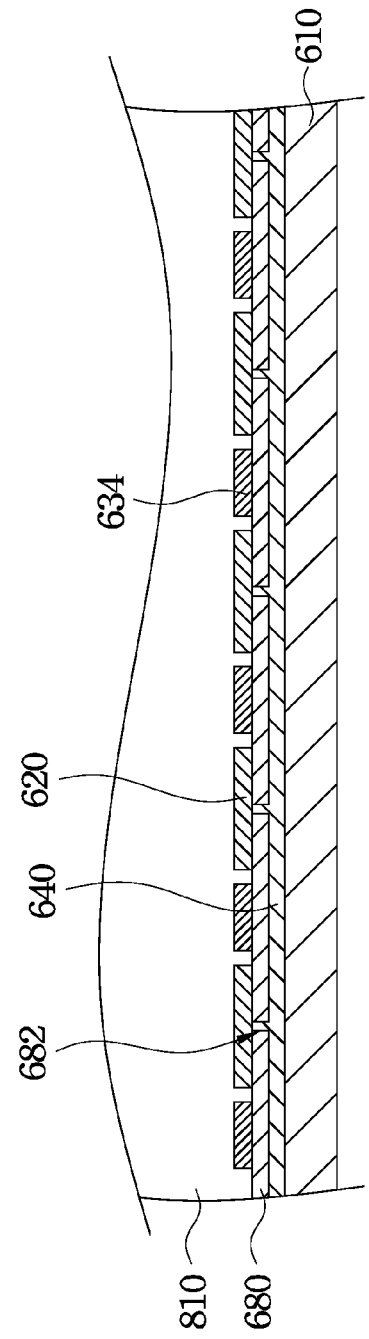
FIG. 16 is a cross-sectional view from the liquid crystal layer to the second substrate shown by making the extension direction of any second main wire in FIG. 11 as the cross-sectional line.

Next, references are made to FIGS. 11 and 16. FIG. 16 is a cross-sectional view from the liquid crystal layer 810 to the second substrate 610 shown by making the extension direction of any second main wire 640 in FIG. 11 as the cross-sectional line. The liquid crystal lens 400 further includes a second insulating layer 680, at least one second main wire 640, and a second main voltage source 650 (see FIG. 11). The second insulating layer 680 is disposed between the second substrate 610 and the second main electrodes 620, and the second insulating layer 680 has a plurality of second main through holes 682 formed therein. The second main wire 640 is disposed at one side of the second insulating layer 680 opposite to the second main electrodes 620, and is electrically connected to the second main electrodes 620 via the second main through holes 682. The second main voltage source 650 is connected to the second main wire 640 for making the second main electrodes 620 have the second main voltage through the second main wire 640.

A first voltage difference exists between the aforementioned first main voltage and the second main voltage. This first voltage difference is the source of the electric field between the first substrate 410 and the second substrate 610. Moreover, the first voltage difference is about 0 V to ±20 V.

Reference is made back to FIG. 11. The refractive index distribution of the liquid crystal layer 810 of the aforementioned liquid crystal lens 400 in the case of applying the electric field may be approximate to that of the physical lens. However, if the first voltage difference continues to increase, the rate of electric field change may be too large for the liquid crystal layer 810 at the edge of the area between the overlapping portions O1 and O2 (see FIG. 14), so that the refractive index distribution of the liquid crystal layer 810 at the space coordinate may be approximate to the square wave curve, which makes the liquid crystal lens 400 cannot reach the effect as the physical lens instead. Therefore, in one or more embodiments, the liquid crystal lens 400 may further include a plurality of first auxiliary electrodes 432, a plurality of second auxiliary electrodes 632 and 634, a plurality of third auxiliary electrodes, and a plurality of fourth auxiliary electrodes 690, which are used for improving the aforementioned problems.

Firstly, references are made back to FIGS. 11 and 12. The first auxiliary electrodes 432 and 434 each are located in the first gaps 422 and 424. However, the first auxiliary electrodes 432 and 434 and the first main electrodes 420 are not contacted to each other, and the dimension of each of the first main electrodes 420 is greater than the dimension of each of the first auxiliary electrodes 432 and 434. A first rectangular-shaped area 510 is defined by four adjacent first auxiliary electrodes 432 and 434, while the third auxiliary electrodes 490 each are located in the area 510, and the third auxiliary electrodes 490 and the first auxiliary electrodes 432 and 434 are not contacted to each other. The first main electrodes 420, the first auxiliary electrodes 432 and 434, and the third auxiliary electrodes 490 all are at the same side of the first insulating layer 480.

Next, references are made back to FIGS. 11 and 13. The second auxiliary electrodes 632 and 634 are located in the second gaps 622 and 624, respectively. However, the second auxiliary electrodes 632 and 634 and the second main electrodes 620 are not contacted to each other, and the size of each of the second main electrodes 620 is greater than the size of each of the second auxiliary electrodes 632 and 634. A second rectangular-shaped area 710 is defined by four adjacent second auxiliary electrodes 632 and 634, while the fourth auxiliary electrodes 690 each are located in the area 710, and the fourth auxiliary electrodes 690 and the second auxiliary electrodes 632 and 634 are not contacted to each other. The second main electrodes 620, the second auxiliary electrodes 632 and 634, and the fourth auxiliary electrodes 690 all are at the same side of the second insulating layer 680. As a result, if different voltage differences cooperate respectively among the first main electrodes 420, the second main electrodes 620, the first auxiliary electrodes 432 and 434, the second auxiliary electrodes 632 and 634, the third auxiliary electrodes 490, and the fourth auxiliary electrodes 690, an effect of the liquid crystal lens may be reached.

In particular, as shown in FIG. 11, the liquid crystal lens 400 further includes a plurality of first auxiliary wires 462 and 464, a plurality of second auxiliary wires 662 and 664, a third auxiliary wire 520, a fourth auxiliary wire 720, first auxiliary voltage sources 472 and 474, second auxiliary voltage sources 672 and 674, a third auxiliary voltage source 530, and a fourth auxiliary voltage source 730, in order to provide different voltages to the electrodes.

Firstly references are made to FIGS. 11 and 17. FIG. 17 is a cross-sectional view from the first substrate 410 to the liquid crystal layer 810 shown by making the extension direction of any first auxiliary wire 462 in FIG. 11 as the cross-sectional line. The first insulating layer 480 further includes a plurality of first auxiliary through holes 484. The first auxiliary wire 462 is disposed at one side of the first insulating layer 480 opposite to the first main electrodes 420, and is electrically connected to the first auxiliary electrodes 432 via the first auxiliary through holes 484. Moreover, the first auxiliary voltage source 472 is connected to the first auxiliary wire 462, so that the first auxiliary electrodes 432 may select to have the first auxiliary voltage or the first main voltage through the first auxiliary wire 462.

References are made to FIGS. 11 and 18. FIG. 18 is a cross-sectional view from the first substrate 410 to the liquid crystal layer 810 shown by making the extension direction of any first auxiliary wire 464 in FIG. 11 as the cross-sectional line. The first insulating layer 480 further includes a plurality of first auxiliary through holes 486. The first auxiliary wire 464 is disposed at one side of the first insulating layer 480 opposite to the first auxiliary electrodes 434, and is respectively electrically connected to the first auxiliary electrodes 434 via the first auxiliary through holes 486. Moreover, the first auxiliary voltage source 474 is connected to the first auxiliary wire 464, so that the first auxiliary electrodes 434 may select to have the first auxiliary voltage or the first main voltage through the first auxiliary wire 464.

References are made to FIGS. 11 and 19. FIG. 19 is a cross-sectional view from the first substrate 410 to the liquid crystal layer 810 shown by making the extension direction of any third auxiliary wire 520 in FIG. 11 as the cross-sectional line. The first insulating layer 480 further includes a plurality of third auxiliary through holes 488. The third auxiliary wire 520 is disposed at one side of the first insulating layer 480 opposite to the first auxiliary electrodes 434, and is respectively electrically connected to the third auxiliary electrodes 490 via the third auxiliary through holes 488. Moreover, the third auxiliary voltage source 530 is connected to the third auxiliary wire 520, so that the third auxiliary electrodes 490 have the first auxiliary voltage through the third auxiliary wire 520.

References are to FIGS. 11 and 20. FIG. 20 is a cross-sectional view from the liquid crystal layer 810 to the second substrate 610 shown by making the extension direction of any second auxiliary wire 662 in FIG. 11 as the cross-sectional line. The second insulating layer 680 further includes a plurality of second auxiliary through holes 684. The second auxiliary wire 662 is disposed at one side of the second insulating layer 680 opposite to the second auxiliary electrodes 632, and is electrically connected to the second auxiliary electrodes 632 via the second auxiliary through holes 684. Moreover, the second auxiliary voltage source 672 is connected to the second auxiliary wire 662, so that the second auxiliary electrodes 632 may be selected to have the second auxiliary voltage or the second main voltage through the second auxiliary wire 662.

References are made to FIGS. 11 and 21. FIG. 21 is a cross-sectional view from the liquid crystal layer 810 to the second substrate 610 shown by making the extension direction of any second auxiliary wire 664 in FIG. 11 as the cross-sectional line. The second insulating layer 680 further includes a plurality of second auxiliary through holes 686. The second auxiliary wire 664 is disposed at one side of the second insulating layer 680 opposite to the second main electrodes 620, and is electrically connected to the second auxiliary electrodes 634 via the second auxiliary through holes 686. Moreover, the second auxiliary voltage source 674 is connected to the second auxiliary wire 664, so that the second auxiliary electrodes 634 may be selected to have the second auxiliary voltage or the second main voltage through the second auxiliary wire 664.

References are made to FIGS. 11 and 22. FIG. 22 is a cross-sectional view from the liquid crystal layer 810 to the second substrate 610 shown by making the extension direction of any fourth auxiliary wire 720 in FIG. 11 as the cross-sectional line. The second insulating layer 680 further includes a plurality of fourth auxiliary through holes 688. The fourth auxiliary wire 720 is disposed at one side of the second insulating layer 680 opposite to the second auxiliary electrodes 632, and is electrically connected to the fourth auxiliary electrodes 690 via the fourth auxiliary through holes 688. Moreover, the fourth auxiliary voltage source 730 is connected to the fourth auxiliary wire 720, so that the fourth auxiliary electrodes 690 have the second auxiliary voltage through the fourth auxiliary wire 720. As a result, by the aforementioned voltage collocation among the electrodes, the liquid crystal lens 400 may be suitable for the stereo display in two orthogonal directions.

Figure 23:
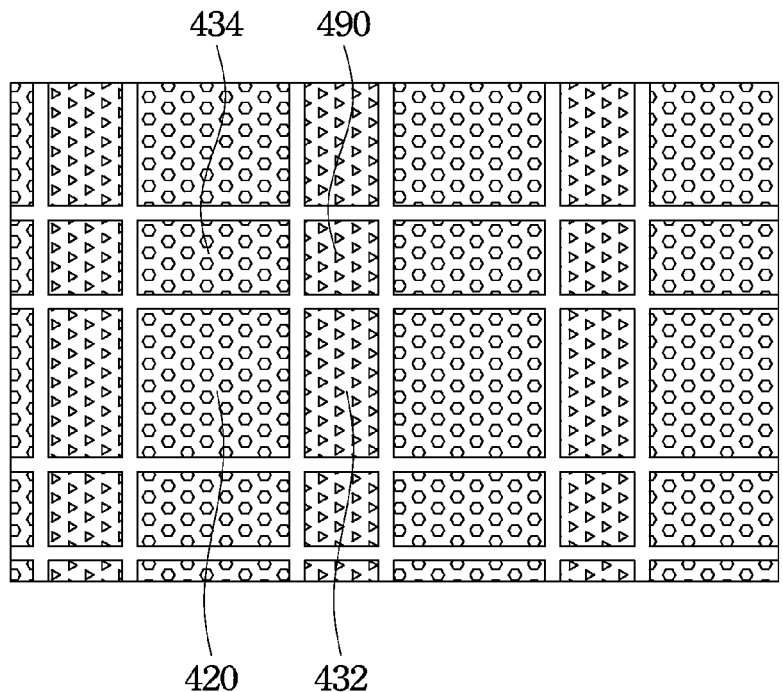
FIG. 23 is a schematic voltage view of each electrode on the first substrate when the liquid crystal lens in FIG. 11 is in a landscape display mode.
Figure 24:
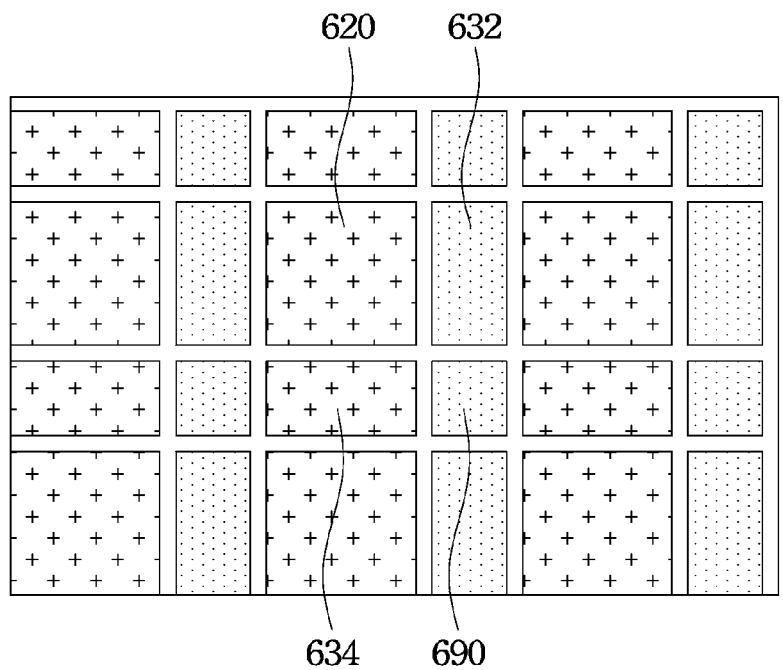
FIG. 24 is a schematic voltage view of each electrode on the second substrate when the liquid crystal lens in FIG. 11 is in the landscape display mode.

For example, reference is made back to FIG. 14. The arrangement direction along the first main electrodes 420 and the first auxiliary electrodes 432 may be defined as a transversal direction, while the arrangement direction along the first main electrodes 420 and the first auxiliary electrodes 434 is defined as a longitudinal direction. Therefore, if one observer observes the liquid crystal lens 400 with a display manner of the liquid crystal lens 400 in FIG. 14, the straight line connected between two eyes of the observer is roughly paralleled to the transversal direction. Accordingly, driving method of the liquid crystal lens 400 should be changed corresponding to the angle formed between the straight line connected between two eyes of the observer and the transversal direction. In particular, references are made to FIGS. 23 and 24. FIG. 23 is a schematic voltage view of each electrode on the first substrate 410 when the liquid crystal lens 400 in FIG. 11 is in a landscape display mode, and FIG. 24 is a schematic voltage view of each electrode on the second substrate 610 when the liquid crystal lens 400 in FIG. 11 is in the landscape display mode. For example, first auxiliary electrodes 434 and first main electrodes 420 are applied same voltage. When the liquid crystal lens 400 is in the case of applying the electric field, the first main electrodes 420, the first auxiliary electrodes 432, the first auxiliary electrodes 434, and the third auxiliary electrodes 490 have the first main voltage, the first auxiliary voltage, the first main voltage, and the first auxiliary voltage respectively, and the second main electrodes 620, the second auxiliary electrodes 632, the second auxiliary electrodes 634, and the fourth auxiliary electrodes 690 have the second main voltage, the second auxiliary voltage, the second main voltage, and the second auxiliary voltage respectively. The first voltage difference exists between the first main voltage and the second main voltage. The second voltage difference exists between the first auxiliary voltage and the second main voltage. The third voltage difference exists between the second auxiliary voltage and the first main voltage. The value of the first voltage difference is greater than that of the second voltage difference and the third voltage difference. That is, the electric field intensity of the liquid crystal layer 810 in FIG. 11 at the area between the overlapping portions O1 and O2 (see FIG. 14) is greater than the electric field intensity in other areas, wherein the electric field in this area is mainly used for providing the liquid crystal molecule deflection. Moreover, the rate of electric field change at the edge of the area between the overlapping portions O1 and O2 may be slowed down due to the second voltage difference and the third voltage difference. Therefore, the refractive index distribution of the liquid crystal molecules may also be smooth, so as to reach the effect as the physical lens.

In particular, reference is made back to FIG. 14. Since the second voltage difference between the first auxiliary electrodes 432 and the second main electrodes 620 is smaller than the first voltage difference, the liquid crystal molecules in the area corresponding to the first voltage difference and the second voltage difference have different orientations. Additionally, since one electric field with the curve form exists between the first main electrodes 420 and the adjacent first auxiliary electrodes 432, this electric field contributes to convert the electric field in the vertical direction between the overlapping portions O1 and O2 gradually into the electric field in the horizontal direction, the acute angle of the aforementioned square wave curve may approach smooth, so that the refractive index distribution presented by the liquid crystal layer 810 in FIG. 11 further fits with that of the physical lens. Moreover, since the assistant action of the second auxiliary electrodes 632 is the same as that of the first auxiliary electrodes 432, it is not described any further.

Figure 26:
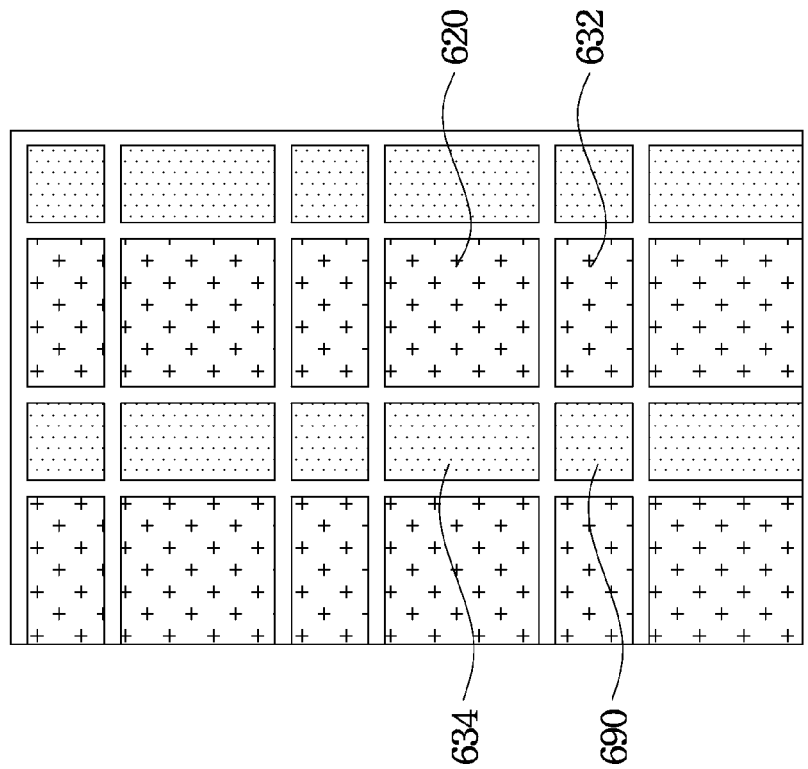
FIG. 26 is a schematic voltage view of each electrode on the second substrate when the liquid crystal lens in FIG. 11 is in the portrait display mode.
Figure 25:
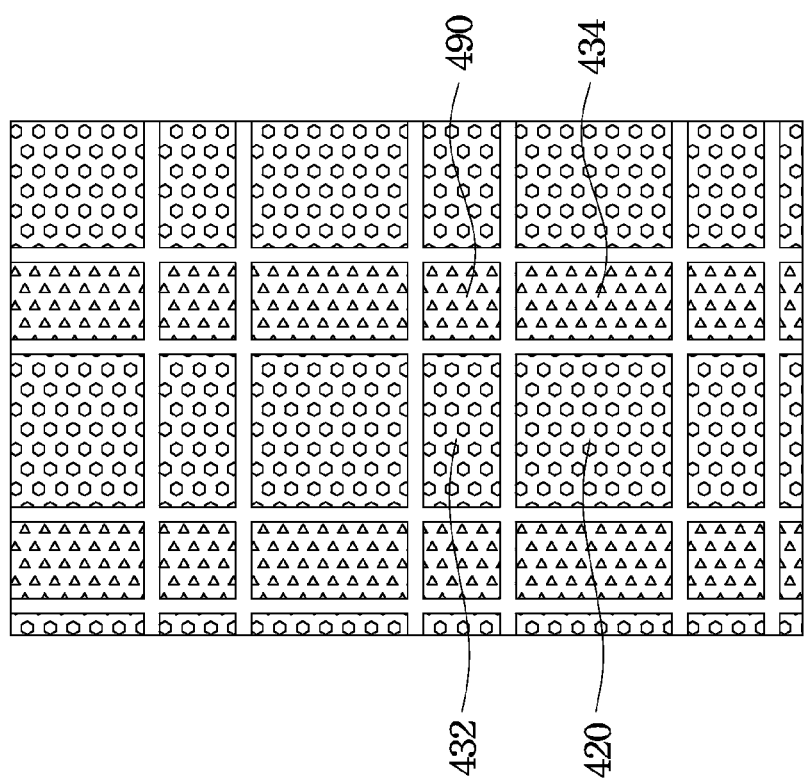
FIG. 25 is a schematic voltage view of each electrode on the first substrate when the liquid crystal lens in FIG. 11 is in a portrait display mode.

References are made to FIGS. 25 and 26. FIG. 25 is a schematic voltage view of each electrode on the first substrate 410 when the liquid crystal lens 400 in FIG. 11 is in a portrait display mode, and FIG. 26 is a schematic voltage view of each electrode on the second substrate 610 when the liquid crystal lens 400 in FIG. 11 is in the portrait display mode. If the observer rotates the liquid crystal lens 400 in FIG. 14 by 90 degrees along a clockwise direction or an anti-clockwise direction to observe the liquid crystal lens 400, the straight line connected between two eyes of the observer is roughly paralleled to the longitudinal direction. Accordingly, driving method of the liquid crystal lens 400 should be changed corresponding to the angle formed between the straight line connected between two eyes of the observer and the longitudinal direction.

In particular, when the liquid crystal lens 400 is in the case of applying the electric field, the first main electrodes 420, the first auxiliary electrodes 432, the first auxiliary electrodes 434, and the third auxiliary electrodes 490 have the first main voltage, the first main voltage, the first auxiliary voltage, and the first auxiliary voltage respectively, and the second main electrodes 620, the second auxiliary electrodes 632, the second auxiliary electrodes 634, and the fourth auxiliary electrodes 690 have the second main voltage, the second main voltage, the second auxiliary voltage, and the second auxiliary voltage respectively. The first voltage difference exists between the first main voltage and the second main voltage. The second voltage difference exists between the first auxiliary voltage and the second main voltage. The third voltage difference exists between the second auxiliary voltage and the first main voltage. The value of the first voltage difference is greater than that of the second voltage difference and the third voltage difference. That is, the electric field intensity of the liquid crystal layer 810 in FIG. 11 between the overlapping portions O1 and O2 (see FIG. 14) is greater than the electric field intensity in other areas, wherein the electric field in this area is mainly used for providing the liquid crystal molecule deflection. Moreover, other details are similar to a voltage operation manner when the straight line connected between two eyes of the observer is roughly paralleled to the transversal direction, which are not described any further.

Additionally, in the case that the first auxiliary electrodes 432, 434 and the second auxiliary electrodes 632, 634 are used for assisting, the first voltage difference may be selected as 0 V to ±30 V, preferably 0 V to ±20 V, and the second voltage difference and the third voltage difference may be selected respectively as about 0 V to ±20 V, preferably 0 V to ±10 V. As a result, a stereo image can be watched using the liquid crystal lens 400 whether the observer watches the liquid crystal lens 400 in the landscape display mode or in the portrait display mode.

However, in one or more embodiments, not all areas in one image are suitable for watching in the stereo image. For example, a text area and a film area may be mixed in a single computer webpage, wherein the text is suitable for presenting in a plane image and the film is suitable for presenting in the stereo image. Therefore, the liquid crystal lens 400 must cooperate with these image areas, to turn on and turn off independently the liquid crystal lens in different areas of the liquid crystal lens 400. The aforementioned demands may be reached with different wiring manners for the wires.

Figure 27:
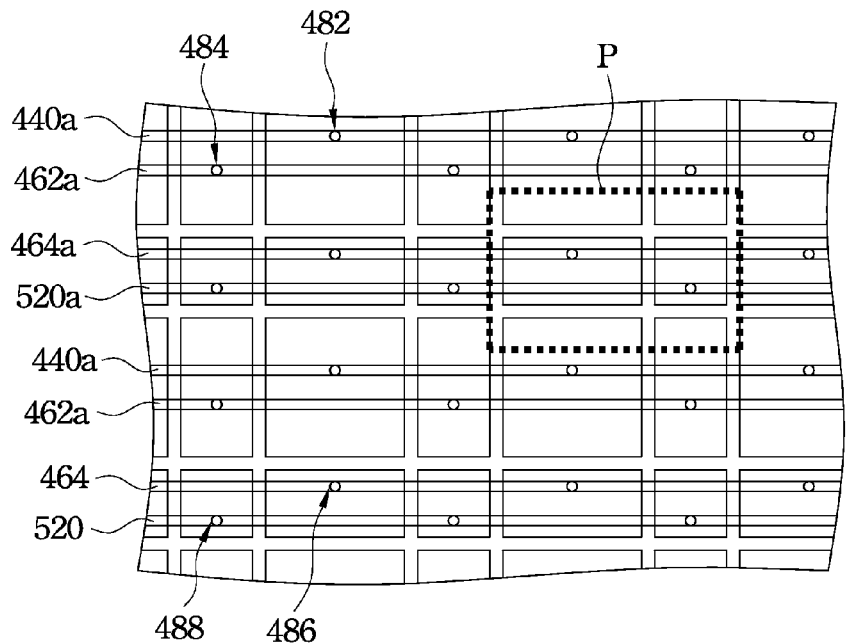
FIG. 27 is a schematic view of wires, electrodes, and through holes placed on the first substrate in FIG. 11.
Figure 28:
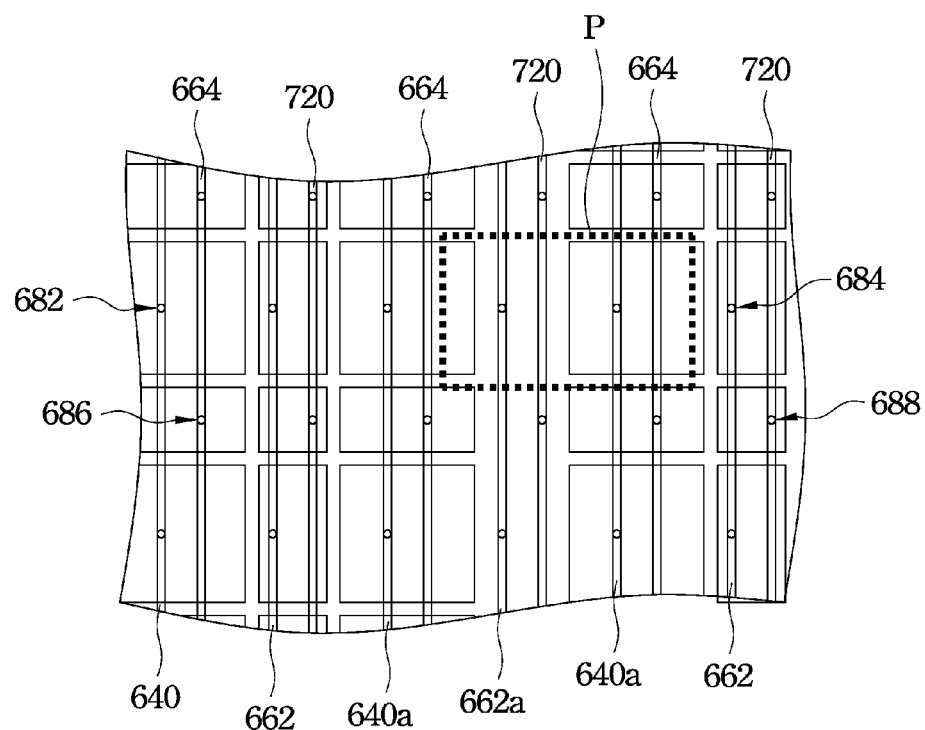
FIG. 28 is a schematic view of wires, electrodes, and through holes placed on the second substrate in FIG. 11.

References are made to FIGS. 27 and 28. FIG. 27 is a schematic view of wires, electrodes, and through holes placed on the first substrate 410 in FIG. 11, and FIG. 28 is a schematic view of wires, electrodes, and through holes placed on the second substrate 610 in FIG. 11. In this embodiment, first main wires 440a, first auxiliary wires 462a, 464a, and 464 as well as the third auxiliary wires 520 are substantially paralleled to each other, and this parallel direction is substantially the same as the transversal direction. Second main wires 640 and 640a, second auxiliary wires 662, 662a, and 664 as well as the fourth auxiliary wires 720 are substantially paralleled to each other, and this parallel direction is substantially the same as the longitudinal direction. Therefore, the first main wires 440a and the second main wires 640 are interlaced. For example, in this embodiment, the first main wires 440a and the second main wires 640 are orthogonal to each other. As a result, if an area P in the figure needs to be used for presenting the stereo image and other areas are used for presenting the plane image, only the first main wires 440a, the first auxiliary wires 462a and 464a, the third auxiliary wires 520a, the second main wires 640a, and the second auxiliary wires 662a needs to be conducted, while other wires are in a non-conducting state, so that the liquid crystal lens may be formed only in the area P and so as to reach the aforementioned purpose. Additionally, the first main through holes 482, the second main through holes 682, the first auxiliary through holes 484, 486, the second auxiliary through holes 684, 686, the third auxiliary though holes 488, and the fourth auxiliary through holes 688 in FIGS. 27 and 28 are all represented by hollow circles.

Figure 29:
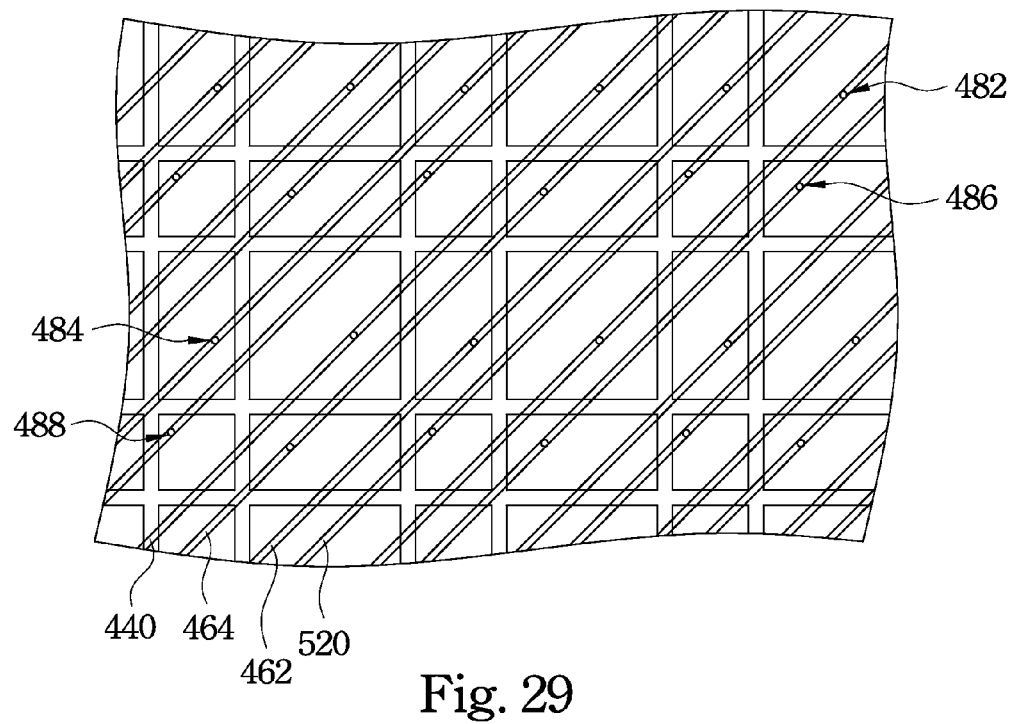
FIG. 29 is a schematic view of wires, electrodes, and through holes placed on the first substrate in the liquid crystal lens according to another embodiment.
Figure 30:
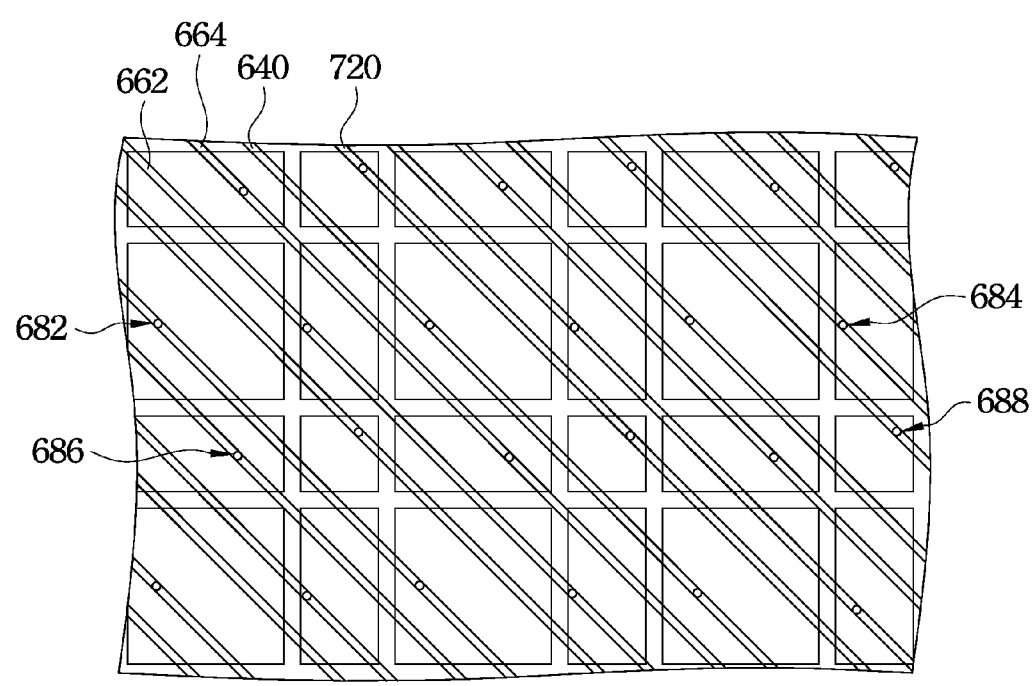
FIG. 30 is a schematic view of wires, electrodes, and through holes placed on the second substrate in the liquid crystal lens according to another embodiment.

However, the aforementioned wiring manner is not intended to limit the invention. References are made to FIGS. 29 and 30. FIG. 29 is a schematic view of wires, electrodes, and through holes placed on the first substrate in the liquid crystal lens according to another embodiment, and FIG. 30 is a schematic view of wires, electrodes, and through holes placed on the second substrate in the liquid crystal lens according to another embodiment. The fabricator may also select to make the first main wires 440, the first auxiliary wires 462 and 464 as well as the third auxiliary wires 520 substantially parallel, but this parallel direction is substantially different from the transversal direction or the longitudinal direction. The second main wires 640, the second auxiliary wires 662 and 664 as well as the fourth auxiliary wires 720 substantially parallel, but this parallel direction is substantially different from the transversal direction or the longitudinal direction. However, the first main wires 440 and the second main wires 640 are still interlaced. Additionally, the first main through holes 482, the second main through holes 682, the first auxiliary through holes 484, 486, the second auxiliary through holes 684, 686, the third auxiliary though holes 488, and the fourth auxiliary through holes 688 in FIGS. 29 and 30 are all represented by the hollow circles.

Figure 31:
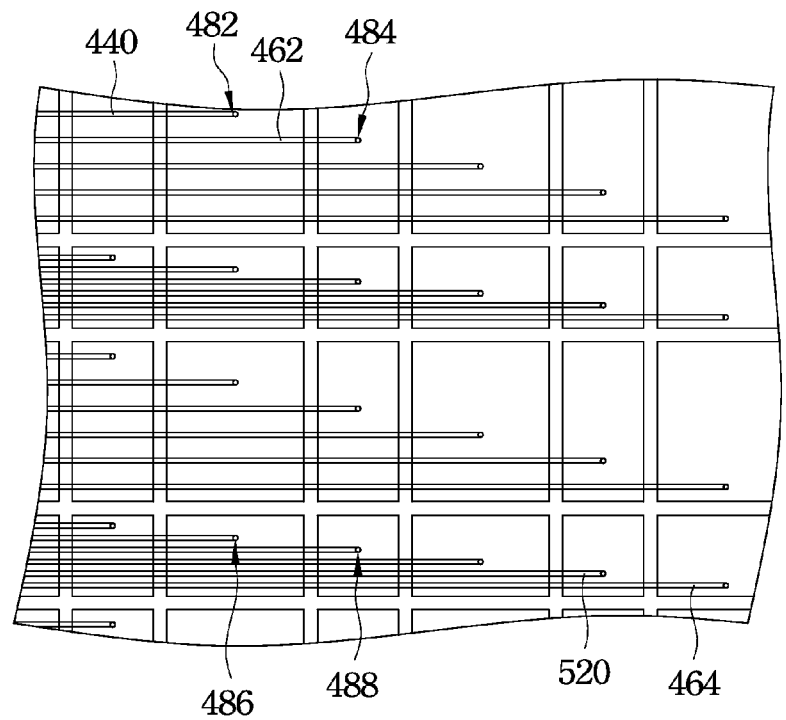
FIG. 31 is a schematic view of wires, electrodes, and through holes placed on the first substrate in the liquid crystal lens according to yet another embodiment.
Figure 32:
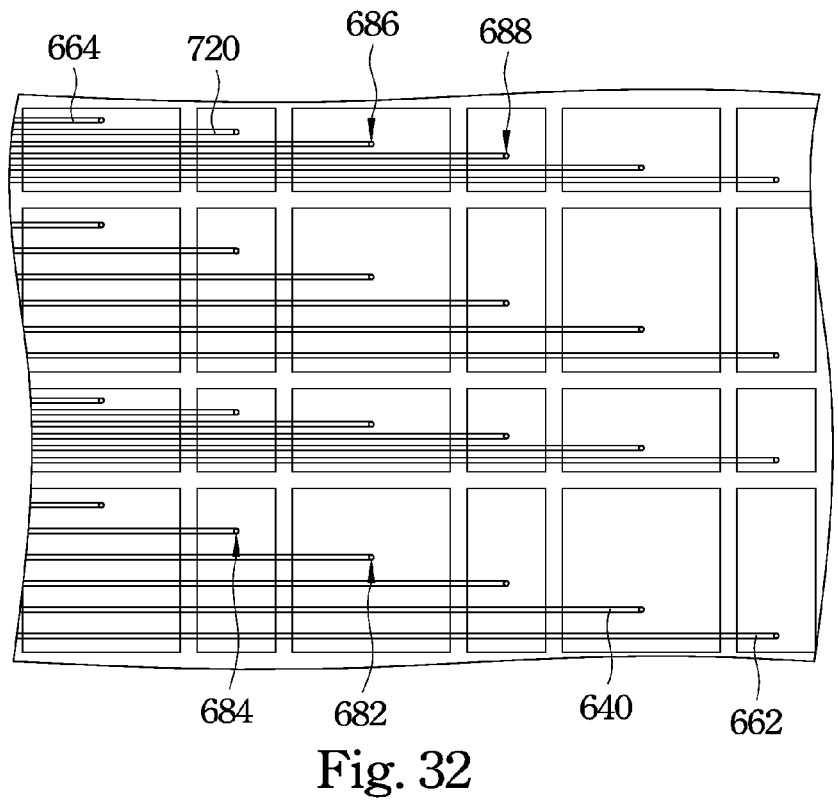
FIG. 32 is a schematic view of wires, electrodes, and through holes placed on the second substrate in the liquid crystal lens according to yet another embodiment.

References are made to FIGS. 31 and 32. FIG. 31 is a schematic view of wires, electrodes, and through holes placed on the first substrate in the liquid crystal lens according to yet another embodiment, and FIG. 32 is a schematic view of wires, electrodes, and through holes placed on the second substrate in the liquid crystal lens according to yet another embodiment. In one or more embodiments, the first main wires 440, the first auxiliary wires 462 and 464, the third auxiliary wires 520, the second main wires 640, the second auxiliary wires 662 and 664 as well as the fourth auxiliary wires 720 all substantially parallel, but each of the aforementioned wires is connected to a single electrode. As a result, as long as the electrodes in the area of the liquid crystal lens desired to form a stereo image are conducted, a partial stereo display function can be generated. Furthermore, as long as each of the wires is connected to a single electrode and the wires are not interconnected, the wiring manner thereof can be designed arbitrarily. Additionally, the first main through holes 482, the second main through holes 682, the first auxiliary through holes 484, 486, the second auxiliary through holes 684, 686, the third auxiliary though holes 488, and the fourth auxiliary through holes 688 in FIGS. 31 and 32 are all represented by hollow circles.

Figure 33:
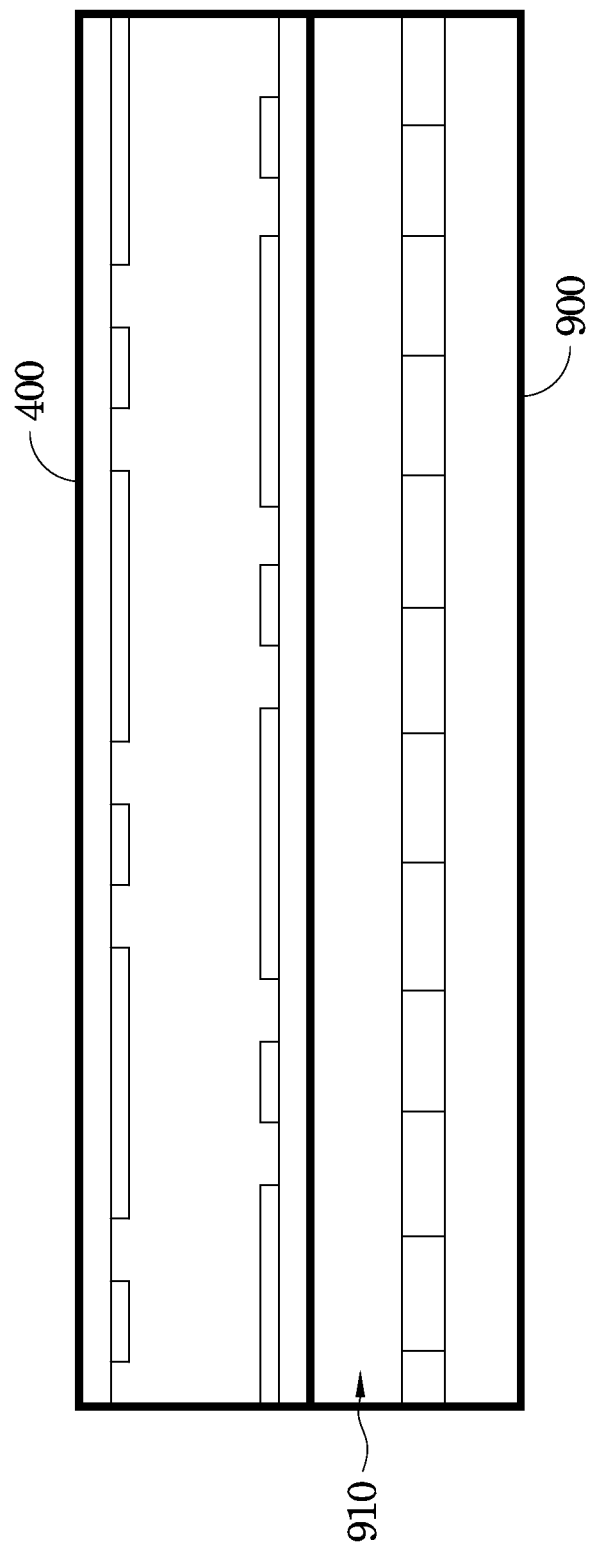
FIG. 33 is a side perspective view of a stereo display according to one embodiment of the invention.

Reference is made to FIG. 33, which is a side perspective view of a stereo display according to an embodiment of the invention. The stereo display includes a display panel 900 and the liquid crystal lens 400. The display panel 900 has a display area 910, and the liquid crystal lens 400 is disposed at the front of the display area 910 of the display panel 900. Therefore, the left-eye and right-eye of the observer can respectively receive plane images displayed in the display area 910 of the display panel 900 via the liquid crystal lens 400 to experience the corresponding stereo image. It should be noted that although the embodiment is exemplified by the liquid crystal lens 400, in practice, this stereo display may also use the liquid crystal lenses 100, 102, or 104, and the invention is not limited to this. Moreover, since the arrangement of the electrodes on the first substrate and the second substrate of the liquid crystal lens in the embodiments of the invention are substantially the same, both of the first substrate and the second substrate may dispose adjacent to the display area 910 of the display panel 900.

Figure 34:
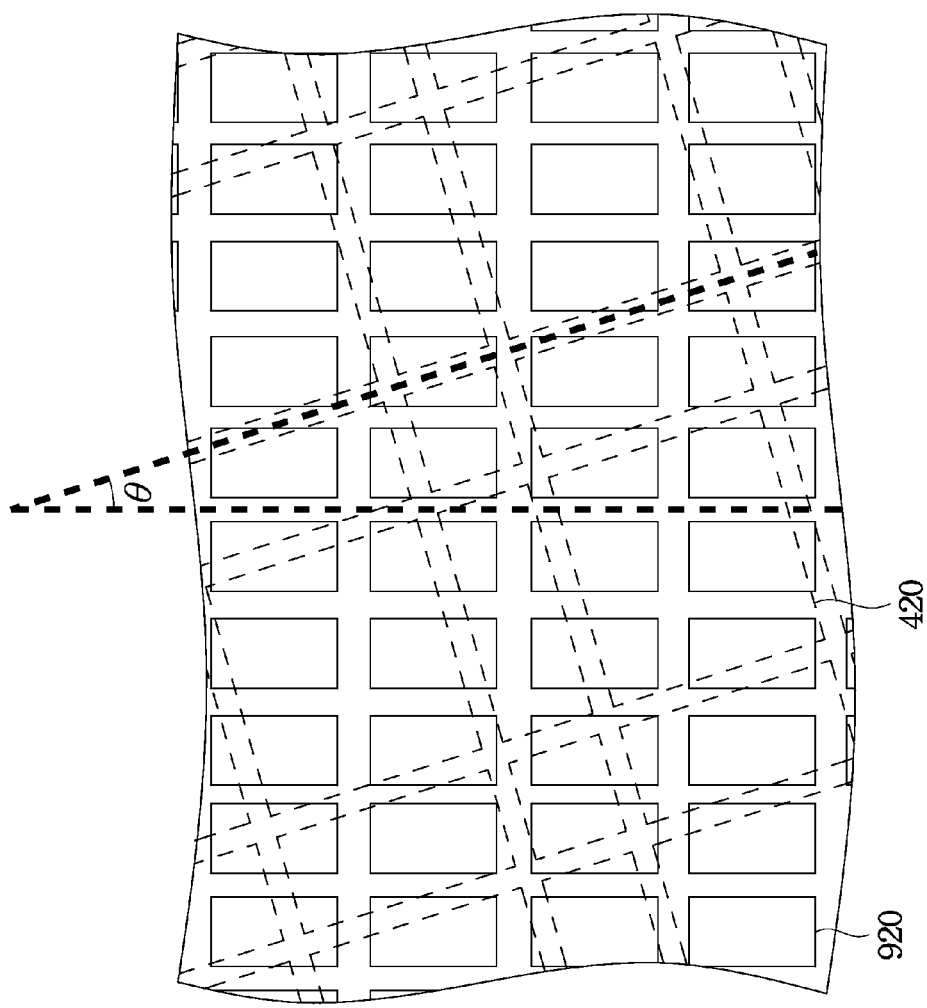
FIG. 34 is a top perspective view of the liquid crystal lens and a display panel in FIG. 33.

Reference is made to FIG. 34, which is a top perspective view of the liquid crystal lens 400 and the display panel 900 of FIG. 33. It should be noted that, for the purpose of clearness, only the electrodes on the first substrate in the liquid crystal lens 400 and a pixel array are shown in the figure. The pixels 920 are represented by solid lines and are arranged to form a pixel array, and the electrodes on the first substrate in the liquid crystal lens are represented by dotted lines, and other elements are omitted. The display panel includes one pixel array. This pixel array has a row direction and a column direction. Moreover, the arrangement directions of the first main electrodes 420 and the second main electrodes (not shown) of the liquid crystal lens are paralleled to neither the row direction nor the column direction. If the arrangement direction of the array formed of the first main electrodes 420 and the second main electrodes is paralleled to the row direction or the column direction of the pixel array, a Moiré effect may be easily generated to the image displayed in the stereo display, making the image be subjected to interference. Therefore, an angle θ is preferably formed between the arrangement direction of the first main electrodes 420 and the column direction of the pixel array, and this angle θ is for example 16 degrees, to avoid generating the Moiré effect.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A liquid crystal lens, comprising:
a first substrate;
a second substrate disposed opposite to the first substrate;
a liquid crystal layer disposed between the first substrate and the second substrate;
a plurality of first main electrodes disposed on a surface of the first substrate adjacent to the liquid crystal layer, wherein any two adjacent of the first main electrodes define a first gap therebetween;
a plurality of second main electrodes disposed on a surface of the second substrate adjacent to the liquid crystal layer, wherein any two of the adjacent second main electrodes define a second gap therebetween, and a projection of each first main electrode on the surface of the second substrate overlaps at least two adjacent second main electrodes to form overlapping portions, and each of the overlapping portions has an overlapping width W, which meets the following conditions:

$$0\ \mu m < W \leq 50\ \mu m;$$

a first insulting layer disposed between the first substrate and the first main electrodes, wherein the first insulating layer has a plurality of first main through holes formed therein;
at least one first main wire disposed at one side of the first insulating layer opposite to the first main electrodes, and electrically connected to the first main electrodes via the first main through holes;
a second insulating layer disposed between the second substrate and the second main electrodes, wherein the second insulating layer has a plurality of second main through holes formed therein; and
at least one second main wire disposed at one side of the second insulating layer opposite to the second main electrodes, and electrically connected to the second main electrodes via the second mail through holes.

2. The liquid crystal lens of claim 1, wherein a projection of each second main electrode on the surface of the first substrate overlaps at least two adjacent first main electrodes.

3. The liquid crystal lens of claim 1, wherein a size of the first main electrodes is the same as a size of the second main electrodes.

4. The liquid crystal lens of claim 1, wherein a size of the first gaps is the same as a size of the second gaps.

5. The liquid crystal lens of claim 1, wherein the first main electrodes and the second main electrodes are strip-shaped, and are respectively disposed on the first substrate and the second substrate along a linear direction.

6. The liquid crystal lens of claim 1, wherein the first main electrodes and the second main electrodes are island-shaped, and are respectively disposed on the first substrate and the second substrate as an array.

7. The liquid crystal lens of claim 1, further comprising:
a first main voltage source for making the first main electrodes have a first main voltage through the first main wire; and
a second main voltage source for making the second main electrodes have a second main voltage through the second main wire, wherein a first voltage difference exists between the first main voltage and the second main voltage, and the first voltage difference is about 0 V to ±30 V, wherein the first main wire and the second main wire are substantially interlaced.

8. The liquid crystal lens of claim 1, further comprising:
a plurality of first auxiliary electrodes respectively disposed in the first gaps, wherein the first auxiliary electrodes and the first main electrodes are not contacted to each other, and the size of each first main electrode is greater than the size of each first auxiliary electrode; and a plurality of second auxiliary electrodes respectively disposed in the second gaps, wherein the second auxiliary electrodes and the second main electrodes are not contacted to each other, and the size of each second main electrode is greater than the size of each second auxiliary electrode.

9. The liquid crystal lens of claim 8, wherein each first gap has a first gap center, and the first auxiliary electrode disposed in the first gap has a first auxiliary electrode center, and positions of the first auxiliary electrode center and the first gap center coincide substantially.

10. The liquid crystal lens of claim 8, wherein each first gap has a first gap center, and the first auxiliary electrode disposed in the first gap has a first auxiliary electrode center, and the first auxiliary electrode center departs from the first gap center.

11. The liquid crystal lens of claim 8, wherein each second gap has a second gap center, and the second auxiliary electrode disposed in the second gap has a second auxiliary electrode center, and positions of the second auxiliary electrode center and the second gap center coincide substantially.

12. The liquid crystal lens of claim 8, wherein each second gap has a second gap center, and the second auxiliary electrode disposed in the second gap has a second auxiliary electrode center, and the second auxiliary electrode center departs from the second gap center.

13. A stereo display, comprising:
a display panel having a display area; and
the liquid crystal lens of claim 1 disposed at the front of the display area of the display panel.

14. The stereo display of claim 13, wherein the display panel comprises a pixel array having a row direction and a column direction, and an arrangement direction of the first main electrodes of the liquid crystal lens is neither parallel to the row direction nor the column direction.

15. A liquid crystal lens, comprising:
a first substrate;
a second substrate disposed opposite to the first substrate;
a liquid crystal layer disposed between the first substrate and the second substrate;
a plurality of first main electrodes disposed on a surface of the first substrate adjacent to the liquid crystal layer, wherein any two adjacent of the first main electrodes define a first gap therebetween; and
a plurality of second main electrodes disposed on a surface of the second substrate adjacent to the liquid crystal layer, wherein any two of the adjacent second main electrodes define a second gap therebetween, and each first main electrode overlaps two adjacent second main electrodes to form two adjacent overlapping areas respectively, and each of the overlapping areas has an overlapping width W, which meets the following conditions:

$0\ \mu m < W \leq 50\ \mu m$.

16. A liquid crystal lens, comprising:
a first substrate;
a second substrate disposed opposite to the first substrate;
a liquid crystal layer disposed between the first substrate and the second substrate;
a plurality of first main electrodes disposed on a surface of the first substrate adjacent to the liquid crystal layer, wherein any two adjacent of the first main electrodes define a first gap therebetween;

a plurality of second main electrodes disposed on a surface of the second substrate adjacent to the liquid crystal layer, wherein any two of the adjacent second main electrodes define a second gap therebetween, and a projection of each first main electrode on the surface of the second substrate overlaps at least two adjacent second main electrodes to form overlapping portions, and each of the overlapping portions has an overlapping width W, which meets the following conditions:

$0\ \mu m < W \leq 50\ \mu m$;

at least one first main wire disposed on the first substrate, and electrically connected to the first main electrodes;
at least one second main wire disposed on the second substrate, and electrically connected to the second main electrodes;
a first main voltage source for making the first main electrodes have a first main voltage through the first main wire; and
a second main voltage source for making the second main electrodes have a second main voltage through the second main wire, wherein a first voltage difference exists between the first main voltage and the second main voltage, and the first voltage difference is about 0 V to ±30 V.

17. A liquid crystal lens, comprising:
a first substrate;
a second substrate disposed opposite to the first substrate;
a liquid crystal layer disposed between the first substrate and the second substrate;
a plurality of first main electrodes disposed on a surface of the first substrate adjacent to the liquid crystal layer, wherein any two adjacent of the first main electrodes define a first gap therebetween;
a plurality of second main electrodes disposed on a surface of the second substrate adjacent to the liquid crystal layer, wherein any two of the adjacent second main electrodes define a second gap therebetween, and a projection of each first main electrode on the surface of the second substrate overlaps at least two adjacent second main electrodes to form overlapping portions, and each of the overlapping portions has an overlapping width W, which meets the following conditions:

$0\ \mu m < W \leq 50\ \mu m$;

a plurality of first auxiliary electrodes respectively disposed in the first gaps, wherein the first auxiliary electrodes and the first main electrodes are not contacted to each other, and the size of each first main electrode is greater than the size of each first auxiliary electrode;
a plurality of second auxiliary electrodes respectively disposed in the second gaps, wherein the second auxiliary electrodes and the second main electrodes are not contacted to each other, and the size of each second main electrode is greater than the size of each second auxiliary electrode;
at least one first main wire disposed on the first substrate, and electrically connected to the first main electrodes;
at least one second main wire disposed on the second substrate, and electrically connected to the second main electrodes;
at least one first auxiliary wire disposed on the first substrate, and electrically connected to the first auxiliary electrodes;
at least one second auxiliary wire disposed on the second substrate, and electrically connected to the second auxiliary electrodes;

a first main voltage source for making the first main electrodes have a first main voltage through the first main wire;

a second main voltage source for making the second main electrodes have a second main voltage through the second main wire, wherein a first voltage difference exists between the first main voltage and the second main voltage;

a first auxiliary voltage source for making the first auxiliary electrodes have a first auxiliary voltage through the first auxiliary wire, wherein a second voltage difference exists between the second main voltage and the first auxiliary voltage; and a second auxiliary voltage source for making the second auxiliary electrodes have a second auxiliary voltage through the second auxiliary wire, wherein a third voltage difference exists between the first main voltage and the second auxiliary voltage, and the first voltage difference is greater than the second voltage difference and the third voltage difference, and the first voltage difference is about 0 V to ±30 V, the second voltage difference is about 0 V to ±20 V, and the third voltage difference is about 0 V to ±20 V.

18. A liquid crystal lens, comprising:

a first substrate;

a second substrate disposed opposite to the first substrate;

a liquid crystal layer disposed between the first substrate and the second substrate;

a plurality of first main electrodes disposed on a surface of the first substrate adjacent to the liquid crystal layer, wherein any two adjacent of the first main electrodes define a first gap therebetween;

a plurality of second main electrodes disposed on a surface of the second substrate adjacent to the liquid crystal layer, wherein any two of the adjacent second main electrodes define a second gap therebetween, and a projection of each first main electrode on the surface of the second substrate overlaps at least two adjacent second main electrodes to form overlapping portions, and each of the overlapping portions has an overlapping width W, which meets the following conditions:

$0~\mu m<W\leq 50~\mu m$;

a plurality of first auxiliary electrodes respectively disposed in the first gaps, wherein the first auxiliary electrodes and the first main electrodes are not contacted to each other, and the size of each first main electrode is greater than the size of each first auxiliary electrode;

a plurality of second auxiliary electrodes respectively disposed in the second gaps, wherein the second auxiliary electrodes and the second main electrodes are not contacted to each other, and the size of each second main electrode is greater than the size of each second auxiliary electrode;

a first insulating layer disposed between the first substrate and the first auxiliary electrodes, wherein the first insulating layer has a plurality of first auxiliary through holes formed therein, the first insulating layer is further disposed between the first substrate and the first main electrodes, and the first insulating layer has a plurality of first main through holes formed therein;

at least one first auxiliary wire disposed at one side of the first insulating layer opposite to the first auxiliary electrodes, and electrically connected to the first auxiliary electrodes via the first auxiliary through holes;

a second insulating layer disposed between the second substrate and the second auxiliary electrodes, wherein the second insulating layer has a plurality of second auxiliary through holes formed therein, the second insulating layer is further disposed between the second substrate and the second main electrodes, and the second insulating layer has a plurality of second main through holes formed therein;

at least one second auxiliary wire disposed at one side of the second insulating layer opposite to the second auxiliary electrodes, and electrically connected to the second auxiliary electrodes via the second auxiliary through holes;

at least one first main wire disposed at one side of the first insulating layer opposite to the first main electrodes and the first auxiliary electrodes, and electrically connected to the first main electrodes via the first main through holes;

at least one second main wire disposed at one side of the second insulating layer opposite to the second main electrodes and the second auxiliary electrodes, and electrically connected to the second main electrodes via the second main through holes;

a first main voltage source for making the first main electrodes have a first main voltage through the first main wire;

a second main voltage source for making the second main electrodes have a second main voltage through the second main wire, wherein a first voltage difference exists between the first main voltage and the second main voltage;

a first auxiliary voltage source for making the first auxiliary electrodes have a first auxiliary voltage through the first auxiliary wire, wherein a second voltage difference exists between the second main voltage and the first auxiliary voltage; and a second auxiliary voltage source for making the second auxiliary electrodes have a second auxiliary voltage through the second auxiliary wire, wherein a third voltage difference exists between the first main voltage and the second auxiliary voltage, and the first voltage difference is greater than the second voltage difference and the third voltage difference, and the first voltage difference is about 0 V to ±30 V, the second voltage difference is about 0 V to ±20 V, and the third voltage difference is about 0 V to ±20 V.

19. The liquid crystal lens of claim 18, wherein either of the first main wire and the first auxiliary wire, and either of the second main wire and the second auxiliary wire are substantially interlaced, and the first auxiliary wire and the second auxiliary wire are substantially interlaced.

20. A liquid crystal lens, comprising:

a first substrate;

a second substrate disposed opposite to the first substrate;

a liquid crystal layer disposed between the first substrate and the second substrate;

a plurality of first main electrodes disposed on a surface of the first substrate adjacent to the liquid crystal layer, wherein any two adjacent of the first main electrodes define a first gap therebetween;

a plurality of second main electrodes disposed on a surface of the second substrate adjacent to the liquid crystal layer, wherein any two of the adjacent second main electrodes define a second gap therebetween, and a projection of each first main electrode on the surface of the second substrate overlaps at least two adjacent second main electrodes to form overlapping portions, and each of the overlapping portions has an overlapping width W, which meets the following conditions:

$0\ \mu m < W \leq 50\ \mu m$;

a plurality of first auxiliary electrodes respectively disposed in the first gaps, wherein the first auxiliary electrodes and the first main electrodes are not contacted to each other, and the size of each first main electrode is greater than the size of each first auxiliary electrode;

a plurality of second auxiliary electrodes respectively disposed in the second gaps, wherein the second auxiliary electrodes and the second main electrodes are not contacted to each other, and the size of each second main electrode is greater than the size of each second auxiliary electrode;

a plurality of third auxiliary electrodes disposed on the surface of the first substrate adjacent to the liquid crystal layer, wherein the plurality of third auxiliary electrodes are respectively located in a plurality of first rectangular-shaped areas, each of which is defined by four adjacent first auxiliary electrodes; and a plurality of fourth auxiliary electrodes disposed on the surface of the second substrate adjacent to the liquid crystal layer, wherein the plurality of fourth auxiliary electrodes are respectively located in a plurality of second rectangular-shaped areas, each of which is defined by four adjacent second auxiliary electrodes.

* * * * *